(12) United States Patent
Whang et al.

(10) Patent No.: US 7,781,976 B2
(45) Date of Patent: Aug. 24, 2010

(54) HIGH EFFICIENCY MERCURY-FREE FLAT LIGHT SOURCE STRUCTURE, FLAT LIGHT SOURCE APPARATUS AND DRIVING METHOD THEREOF

(75) Inventors: Ki-Woong Whang, Samik Village C-dong, 1649-7, Seocho-dong, Seocho-gu, Seoul,137-070 (KR); Ju-Kwang Lee, Seoul (KR)

(73) Assignee: Ki-Woong Whang, Seoul (KR)

( * ) Notice: Subject to any disclaimer, the term of this patent is extended or adjusted under 35 U.S.C. 154(b) by 1161 days.

(21) Appl. No.: 11/407,703

(22) Filed: Apr. 20, 2006

(65) Prior Publication Data
US 2006/0290267 A1    Dec. 28, 2006

(30) Foreign Application Priority Data

Apr. 20, 2005    (KR) ...................... 10-2005-0032560
Apr. 12, 2006    (KR) ...................... 10-2006-0033281

(51) Int. Cl.
*H01J 17/04*    (2006.01)
*H01J 61/04*    (2006.01)
(52) U.S. Cl. ...................... 313/631; 313/637; 313/487; 313/493; 313/607
(58) Field of Classification Search ......... 313/581–587, 313/484–487, 489, 491, 493, 607, 631, 637, 313/643
See application file for complete search history.

(56) References Cited

U.S. PATENT DOCUMENTS

| 6,611,099 B1 * | 8/2003 | Murata et al. ............... 313/582 |
| 2003/0122771 A1 * | 7/2003 | Sumiyoshi et al. .......... 345/102 |
| 2005/0280347 A1 * | 12/2005 | Jang et al. ................... 313/492 |
| 2006/0001377 A1 * | 1/2006 | Hur et al. .................... 313/584 |

(Continued)

FOREIGN PATENT DOCUMENTS

EP    1460669 A1    9/2004

(Continued)

OTHER PUBLICATIONS

Shiga T et al., "No-Mercury Flat Discharge Lamp for LCD Backlighting" IDW, FMC-4 Invited, London UK, Jan. 1, 1999, pp. 347-350.

(Continued)

*Primary Examiner*—Toan Ton
*Assistant Examiner*—Kevin Quarterman
(74) *Attorney, Agent, or Firm*—The Webb Law Firm

(57) ABSTRACT

A flat light source structure includes an upper substrate made of a light transmitting material; a lower substrate separated from the upper substrate by a distance; a barrier rib for maintaining the distance, thereby defining a discharge space filled with a discharge gas; a phosphor coated on at least one of the inner surfaces of the upper substrate and the lower substrate, respectively; a pair of main electrodes disposed at predetermined positions on the surface of the upper or lower substrate and applied with a predetermined driving voltage, frequency and duty ratio to excite the phosphor by plasma generated; an auxiliary electrode formed at a predetermined position on the lower and/or upper substrate(s) to have a parallel component which is parallel with any one of the main electrodes when viewing the discharge space from the upper substrate and a perpendicular component which traverses across the pair of main electrodes.

17 Claims, 37 Drawing Sheets

U.S. PATENT DOCUMENTS

| | | |
|---|---|---|
| 2006/0006805 A1* | 1/2006 | Son et al. .................... 313/607 |
| 2006/0061275 A1 | 3/2006 | Kim et al. |
| 2006/0113914 A1* | 6/2006 | Fujitani et al. ............. 313/586 |
| 2006/0238125 A1* | 10/2006 | Hur et al. .................... 313/586 |

FOREIGN PATENT DOCUMENTS

| | | | |
|---|---|---|---|
| EP | 1 505 623 A1 | 9/2005 |
| JP | 57 007045 A | 1/1982 |
| JP | 57 136735 A | 8/1982 |
| JP | 2000194317 | 7/2000 |
| JP | 2003-132851 A | 5/2003 |
| JP | 2004-311042 A | 4/2004 |

OTHER PUBLICATIONS

Sang-Hun Jang et al. "Improvement of Luminance and Luminous Efficiency Using Address Voltage Pulse During Sustain-Period of AC-PDP", Transactions on Electron Devices, vol. 48, No. 9, Sep. 2001, pp. 1903-1910.

T. Shiga and S. Mikoshiba, "Lateral Multi-Channel Flat Discharge Fluorescent Lamp for LC-TV Backlight", May 25, 2004, pp. 1330-1333.

N. Fisekovic et al. "Improved Motion-Picture Quality of AM-LCDs Using Scanning Backlight", IDW, Jan. 1, 1999, pp. 1637-1640.

* cited by examiner

PRIOR ART

(a)

(b)

(c)

(d)

(e)

PRIOR ART

200

200

20

20

24

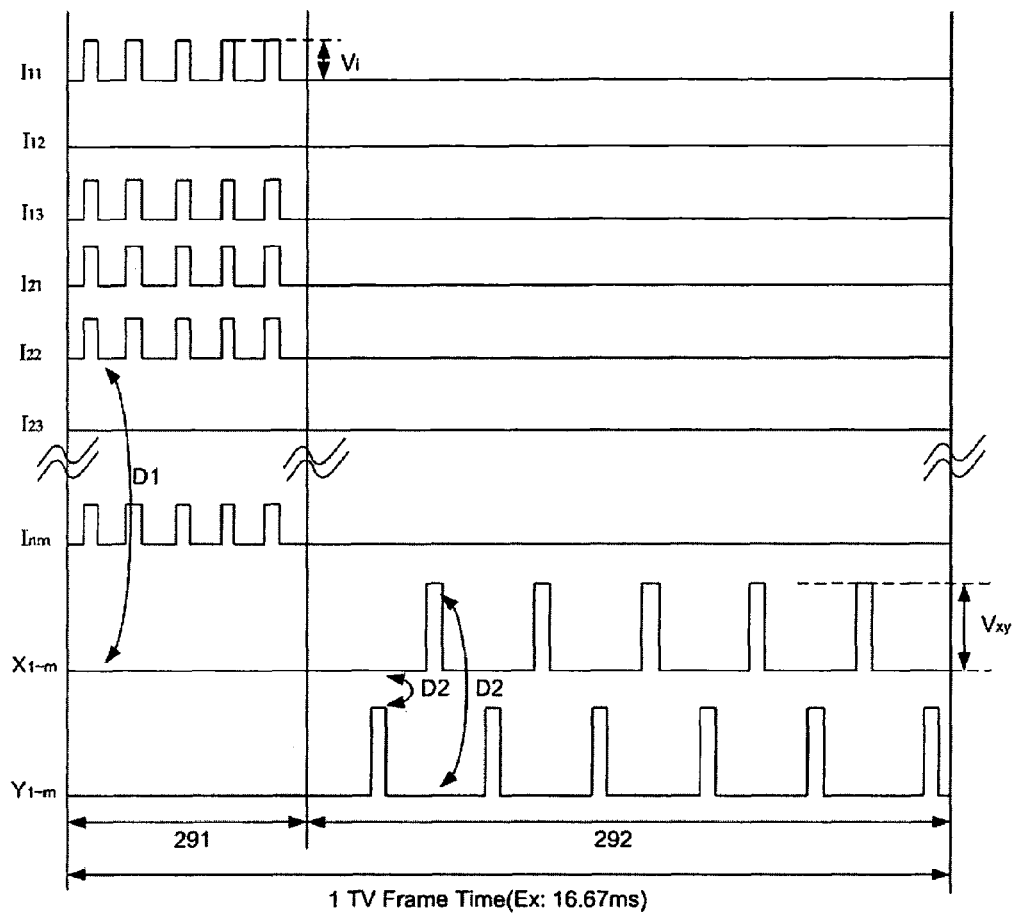

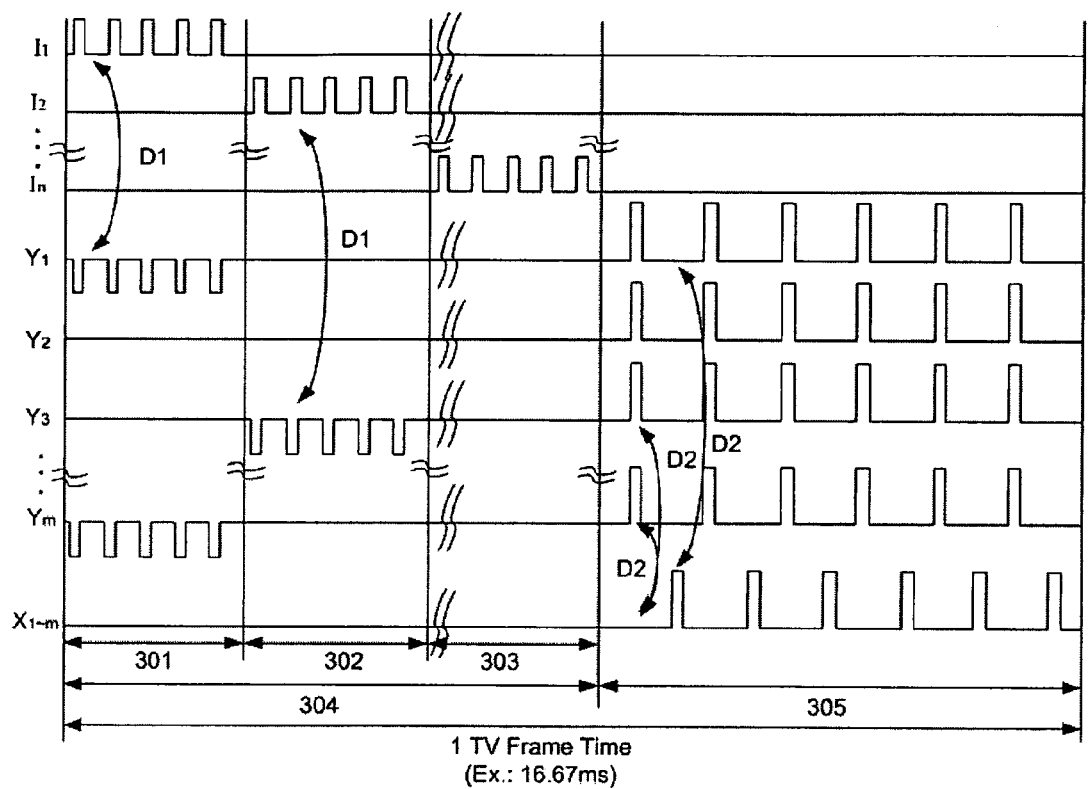

(a)          (b)          (c)

(a)　　　　　　　　　(b)　　　　　　　　　(c)

(a)　　　　　　　　　(b)　　　　　　　　　(c)

HIGH EFFICIENCY MERCURY-FREE FLAT LIGHT SOURCE STRUCTURE, FLAT LIGHT SOURCE APPARATUS AND DRIVING METHOD THEREOF

CROSS-REFERENCE TO RELATED APPLICATIONS

This application claims priority from Korean Patent Applications No. 2005-32560 and No. 2006-33281, filed on Apr. 20, 2005 and Apr. 12, 2006, respectively, in the Korean Intellectual Property Office, the disclosure of which is incorporated herein by reference.

BACKGROUND OF INVENTION

1. Field of Invention

The present invention relates to a Mercury-free flat light source structure, and more particularly, to a Mercury-free flat light source structure capable of enhancing and adjusting brightness, maintaining stable and uniform discharge, and improving luminous efficiency, a large flat light source apparatus using the same Mercury-free flat light source structure as a unit cell in order to adjust brightness and cause local discharges in selective areas, and a driving method thereof.

2. Description of the Related Art

In general, a flat or planar light source apparatus has a wider range of applicability compared to a line light source apparatus as the back lights of passive type display apparatus such as liquid crystal display (LCD) units or lightings. However, there is a difficulty in constructing an optimized flat light source apparatus with sufficient luminance and luminous efficiency. For such a reason, a flat light source apparatus has been typically implemented by overlapping a plurality of linear light source apparatuses such as fluorescent lamp or light emitting diode (LED) and/or a plurality of point source apparatuses, and by using additional optical parts such as diffusion plate or reflection plate, thereby changing the linear light source and/or the point light source into a flat light source. This kind of flat light source apparatuses are disadvantageous in that light efficiency decreases greatly and manufacturing cost becomes higher due to a lot of additional parts required for converting the line and/or point light source apparatuses to a flat light source apparatus. Further, since the flat light source apparatus is implemented by assembling a plurality of light source apparatuses, it is difficult to partially emit light from selected areas or difficult to adjust their brightness. Accordingly, there is still a need to develop a flat light source apparatus capable of light-emitting over the entire area by itself with high luminance and luminous efficiency, capable of allowing active adjustment such as adjustment of brightness in a short time of one TV frame time (e.g. 16.67 milliseconds) of TV image signal, and capable of emitting lights with different brightness levels from selected areas.

Conventional flat light sources such as the fluorescent light sources used to use a Mercury-containing gas as the discharge gas. The reason of such is that the fluorescent light source with a Mercury containing gas shows excellent discharge characteristics and wide driving voltage margin. However, a light source based on Mercury discharge is disadvantageous in that Mercury is expected to be restricted in use for lightings because it is classified as an environmentally hazardous material, and the light source becomes difficult to operate and its luminous efficiency decreases when the lamp temperature becomes low, which necessitates a Mercury-free discharge gas. Accordingly there is still a need to develop a flat light source apparatus using a Mercury-free discharge gas.

FIG. 1 schematically illustrates a conventional flat light source using a Mercury-free discharge gas. A conventional flat light source 100 comprises an upper substrate 10, a lower substrate 20 and barrier ribs 30, and generates plasma in a discharge space defined by the upper substrate 10, the lower substrate 20 and the barrier ribs 30 when an appropriate voltage waveform is supplied to a pair of electrodes disposed near the discharge space to induce electric field. As the ultra violet (UV) rays emitted from the plasma excite the phosphors 18 and 24 coated on the inner-side the discharge space, the visible light rays 5 are emitted. Particularly, as shown in FIG. 1, the light source having electrodes X and Y covered with a dielectric layer 16 and disposed in the discharge space is called a dielectric barrier discharge (DBD) type, and the light source 100 is driven with driving waveforms applied to the electrodes X and Y where the polarities of the driving waveforms are changed periodically. FIG. 2 illustrates a typical driving waveform for driving the flat light source 100.

In order to manufacture the flat light source 100, the first barrier ribs 30 are formed between the upper substrate 10 and the lower substrate 20 which are typically made of glass or silica, then the upper substrate 10 and the lower substrate 20 are hermetically sealed to each other, the discharge space is evacuated, and a discharge gas is injected and finally sealed off. The electrodes X and Y are formed to have their ends protruded from the end of the light source 100 so as to be easily electrically connected to an external driving circuit.

Before the upper substrate 10 and the lower substrate 20 are put together, phosphor layers 18 and 24 are formed at proper positions. If it is necessary, a reflection layer 22 is formed so as for light to be emitted toward one direction. The discharge gas usually contains Xe, which emits vacuum ultra violet rays when excited. The discharge gas can be a mixture gas further containing various gases such as He, Ne, Ar, Kr, etc.

Here, a voltage pulse to be applied to the electrodes to initiate a discharge is determined mainly by the distance between the electrodes and the gas pressure. Given that a discharge gap, the distance between the electrodes of a flat light source is sufficiently long as much as a positive column area which is effective in a glow discharge is utilized enough, the discharge breakdown voltage is determined by the discharge gas pressure and composition as follows:

$$V_f = \frac{Bpd}{\ln(pd) + \ln\left(\frac{A}{\ln\left(1+\frac{1}{\gamma}\right)}\right)}$$

where A and B are constants determined by the kinds of gases, pd is a value of discharge gas pressure p multiplied by discharge gap (distance) d, and γ is the coefficient of secondary electrons generated by ions on the cathode surface.

FIGS. 3(a) through 3(e) illustrate the change of discharge status according to time in a conventional flat light source. If a voltage is applied between the electrodes protected by dielectric layers, a local discharge is started as shown in FIG. 3(a), initial discharge paths having an elongated band shape are then formed between the two electrodes as shown in FIG. 3(b) after a predetermined time in which the voltage is applied continuously. After that, referring to FIG. 3(c), if the applied voltage increases further, the discharge paths expand in a space between the electrodes in the vertical direction. As the discharge paths expand, referring to FIG. 3(d), the discharge paths are combined with neighboring discharge paths to fill the discharge space, thereby generating a discharge uniform over the entire area.

The discharge is typically generated by way of process steps including (a) inducement of electric field in the discharge space by application of a voltage to the electrodes, (b) acceleration of charged particles by the electric field, (c) generation of Townsend discharge, (d) progress that a neutral gas turns into plasma from an area where the density of charged particles is high, (e) formation of initial discharge paths according to the direction of the electric field, (f) acceleration of charged particles of the plasma toward opposite polarity electrodes, (g) formation of a wall potential by the charged particles accumulated on electrode surfaces after one cycle of a driving voltage signal, (h) formation of a wall voltage by the wall potential, (i) application of a voltage to the opposite electrode by a pulse with the reversed polarity, and (j) formation of the high electric field as the applied voltage is added to the wall voltage. Continuous polarity reversal of the applied voltage results in the stable, diffused, glow discharge.

However, the conventional flat light source apparatus as shown in FIG. 3(e) has a disadvantage that the discharge contraction (filamentation) is easily caused. For example, if the application power abruptly increases, if the discharge gas condition is not proper, or if non-uniformity is induced due to the structure of a discharge vessel, the discharge is concentrated partially as shown in FIG. 3(e), and for example, the abrupt increase of a discharge current takes place. In case that such a phenomenon appears, the brightness of the area where the discharge is concentrated abruptly enhances and a uniform brightness over the entire surface cannot be obtained. In the status of foregoing, if the application voltage increases, the width of a discharge area slightly widens but an abrupt increase of a discharge current is accompanied thereto. Consequently, it can be regarded as a discharge mode change, and such a local discharge concentration is thought to be caused by the plasma instability. The reasons thereof are diverse but the main reason is thought to be a non-uniform distribution of charged particles and thermal instability in the discharge space.

The local discharge concentration is caused by the procedure including the steps of (a) local increase of electron density, (b) local increase of resistive heating at an area where the electron density is high, (c) local increment of gas temperature, (d) reduction of neutral particle density due to the increase of gas temperature, (e) increase of electron temperature due to E/N (electric field to gas density ratio) enhancement at the corresponding area, and (f) further increase of electron density.

Repetition of the above procedures results in strong concentration of discharge along the line of electric force. If the discharge mode changes due to the discharge contraction, the current abruptly increases and the discharge is contracted, and as a result, a uniform, whole surface discharge cannot be obtained. According to the facts known recently, many factors affect the discharge concentration including the applied voltage, composition and partial pressure of discharge gases, the frequency and the duty ratio of a driving pulse applied, and the structural variable such as the cross-sectional shape of the discharge space.

In the above-described conventional flat light source, there exists a very narrow operational voltage margin or area where a discharge can be generated stably on the whole surface of a panel, avoiding the discharge contraction. In the respect of a voltage in the operational margin, the voltage is greater than the discharge breakdown voltage and less than the discharge contraction voltage ($V_{firing}$<normal driving voltage<$V_{contraction}$). On the other hand, in the respect of the composition of a discharge gas, there exists a content limit of a gas in determining the content of a specific gas (for example, content of Xe). In the respect of the discharge gas pressure, application voltage, frequency of the application voltage and duty ratio (Ton min<operation pulse width<Ton contraction), there is a certain operational range where the flat light source operates stably. Further, as the operational range becomes wider, the flat light source becomes more stable and efficient.

Further, a conventional flat light source includes the phosphor layers 24 and 18 on the surfaces of the lower substrate 20 and the upper substrate 10, respectively as shown in FIG. 1. The phosphor layers are formed on the upper substrate 10 as well as the lower substrate 20 to maximize the efficiency of use of the vacuum ultra violet rays since the vacuum ultra violet rays emitted from the plasma generated in the discharge space are emitted in all directions. However, in order to obtain high brightness and efficiency, the upper substrate 10 should be capable of self-emitting as well as transmitting the visible light emitted from the phosphor layer 24 on the lower substrate 20 with high transmittance. Accordingly, the thickness and structure of the phosphor layers should be optimized taking into account of the brightness and efficiency.

Further, the conventional flat light source 100 shown in FIG. 1 is disadvantageous in that the phosphor layers adhere very weekly to the upper and lower substrate and can be easily separated from the surface of the substrates.

SUMMARY OF THE INVENTION

Accordingly, it is an aspect of the present invention to provide a flat light source structure with enhanced luminous efficiency by inducing a stable discharge over the entire surface and by adjusting brightness in short time, and a driving method thereof.

It is another aspect of the present invention to provide a flat light source structure with a wide driving margin and a wide operational condition and a driving method thereof.

It is further another aspect of the present invention to provide a flat light source structure having high brightness and efficiency by optimizing the structure of the phosphor layer and the driving method thereof.

It is still further another aspect of the present invention to provide a flat light source structure having a phosphor layer which is strong against thermal and mechanical stress due to the improved surface structure of a lower substrate on which the phosphor layer is coated, and is not easily separated from the lower substrate, and a driving method thereof.

It is yet a further aspect of the present invention to provide a flat light source apparatus using the above-described flat light source structures, each acting as a unit cell, arranged in rows and columns, thereby being a large-sized light source capable of partially emitting light from selected areas, and being capable of adjusting their brightness, and a driving method thereof.

The foregoing and/or other aspects of the present invention can be achieved by providing a flat light source structure, including: an upper substrate made of a light transmitting material; a lower substrate separated from the upper substrate by a distance; a barrier rib for maintaining the distance between the upper substrate and the lower substrate, thereby defining a discharge space filled with a discharge gas at a predetermined pressure between the upper substrate and the lower substrate; a phosphor layer coated on at least one of the inner surfaces of the upper substrate and the lower substrate, respectively; a pair of main electrodes disposed at predetermined positions on the surface of the upper and/or lower substrate and applied with a predetermined driving voltage to induce electric field which may generate plasma in the discharge space where the vacuum ultra violet light from plasma excites the phosphor so as for the phosphor to emit visible light; an auxiliary electrode formed at a predetermined position on the lower and/or upper substrate(s) and having a parallel component which is parallel with any one of the main electrodes when viewing the discharge space from the upper substrate and a perpendicular component which traverses the electrodes across the pair of main electrodes.

In the flat light source structure above, it is preferable that the auxiliary electrode is formed on the inner surface or the outer surface of the upper or the lower substrate.

In the flat light source structure above, it is preferable that the auxiliary electrode formed on the inner or outer surface of the upper substrate is made of a light transmitting material.

In the flat light source structure above, it is preferable that, when viewing the auxiliary electrode from the upper substrate, the auxiliary electrode is patterned to substantially surround the discharge space.

In the flat light source structure above, the upper and lower substrates have a rectangular, modified-rectangular or circular shape as a whole.

In the flat light source structure above, the auxiliary electrode looks like a rectangular, modified-rectangular or circular shape as a whole.

In the flat light source structure above, the phosphor layer is formed non-uniformly depending on its locations on the inner surface of the upper substrate.

In the flat light source structure above, it is preferable that the phosphor is formed as a pattern with a plurality of island structures separated from each other.

In the flat light source structure above, the lower substrate preferably has a plurality of micro barrier ribs with a height less than that of the barrier rib on the inner surface thereof and the micro barrier ribs are covered with the phosphor layer.

In the flat light source structure above, the discharge gas contains Xe.

In the flat light source structure above, the discharge gas further contains at lease one of gases selected from the group consisting of He, Ne, Ar and Kr.

According to another aspect of the present invention, there is provided a driving method of a flat light source structure, comprising the steps of: generating a priming discharge between the auxiliary electrode and at least one of a first electrode and a second electrode constituting the main electrodes; and generating a main discharge between the first electrode and the second electrode.

In the method above, in the step of generating the priming discharge, the potential between the auxiliary electrode and the first electrode or the second electrode is set to be greater than the discharge breakdown voltage.

In the method above, in the step of generating the main discharge, the potential between the first electrode and the second electrodes is set to be greater than the fully diffused discharge initiating voltage.

In the method above, the first electrode is applied with a first voltage waveform having a repetitive pattern with a predetermined frequency and a predetermined duty ratio, the second electrode is applied with a second voltage waveform in which the peak voltage periods are not overlapped with those of the first voltage waveform, and the auxiliary electrode is applied with a third voltage waveform synchronized with the first and/or the second voltage waveforms, wherein the amplitude of the third voltage waveform may be preferably the same as those of the first voltage waveform and the second voltage waveform.

In the method above, the first electrode is applied with a first waveform having a repetitive pattern with a predetermined frequency and a predetermined duty ratio, the second electrode is applied with a second voltage waveform having a pattern, in which the peak voltage periods are not overlapped with those of the first voltage waveform, and a third voltage waveform having a repeating pattern synchronized with the first waveform and the second voltage waveform is induced to the floated auxiliary electrode, wherein the amplitude of the third voltage waveform may be preferably smaller than those of the first voltage waveform and the second voltage waveform.

In the method above, the first electrode is applied with a first voltage waveform having a repetitive pattern with a predetermined frequency and duty ratio, the second electrode is applied with a second voltage waveform in which the peak voltage periods are not overlapped with those of the first voltage waveform, and the auxiliary electrode is applied with a ground voltage.

In the method above, the first electrode is applied with a first voltage waveform having positive pulses and negative pulses which are alternately repeated and have a predetermined frequency and a predetermined duty ratio, the second electrode is applied with a second voltage waveform synchronized with the first voltage waveform and having opposite polarities of pulses to the first voltage waveform, and the auxiliary electrode is applied with a third voltage waveform having positive or negative pulses synchronized with the first and second voltage waveforms.

In the method above, it is preferable that, the auxiliary electrode is applied with a voltage waveform having a repetitive pattern before the first and second electrodes are applied with predetermined voltage waveforms, and the auxiliary electrode is applied with a ground voltage while the first electrode and the second electrode are applied with the predetermined voltage waveform.

Here, the brightness may be adjusted by varying any one or more of the potential difference of pulses applied to the first electrode and the second electrode, the frequency, and the duty ratio.

In the method above, the first, second and third waveforms are square or sinusoidal waves.

In the method above, the first, second and third voltage waveforms have a frequency of 50 kHz or lower.

According to another aspect of the present invention, there is provided a flat light source structure, comprising: an upper substrate made of a light transmitting material; a lower substrate separated from the upper substrate by a distance; a barrier rib disposed between the upper and lower substrates to maintain the distance between the upper and lower substrates, thereby defining a discharge space filled with a discharge gas with a predetermined pressure; a phosphor coated on at least a portion of the inner surface of the upper and lower substrates, the portion surrounding the discharge space; and a pair of main electrodes applied with a driving voltage and patterned at predetermined positions on the upper and/or lower substrates for inducing electric field in the discharge space, thereby generating plasma in the discharge space so as for visible light to be emitted as the ultraviolet ray emitted from the plasma excites the phosphor; wherein the phosphor coated on the inner surface of the upper substrate is formed non-uniformly depending on its locations.

According to still further another aspect of the present invention, there is provided a flat light source structure, comprising: an upper substrate made of a light transmitting material; a lower substrate separated from the upper substrate by a distance; a barrier rib disposed between the upper and lower substrates to maintain the distance between the upper and lower substrates, thereby defining a discharge space filled with a discharge gas with a predetermined pressure; a phosphor coated on at least a portion of the inner surface of the upper and lower substrates, the portion surrounding the discharge space; and a pair of main electrodes applied with a driving voltage and patterned on predetermined positions on the upper and/or lower substrates for inducing electric field in the discharge space, thereby generating plasma in the discharge space so as for visible light to be emitted as the ultraviolet ray emitted from the plasma excites the phosphor; wherein the lower substrate has micro barrier ribs with a height less than that of the barrier ribs on the inner surface thereof, and the phosphor is coated to cover the micro barrier ribs.

According to yet further another aspect of the present invention, there is provided a flat light source apparatus, comprising: a flat light source structure including an upper substrate made of a light transmitting material, a lower substrate separated from the upper substrate by a distance, a barrier rib disposed between the upper and lower substrates to maintain the distance between the upper and lower substrates, thereby defining a discharge space filled with a discharge gas with a predetermined pressure, a phosphor coated on at least a portion of the inner surface of the upper and lower substrates, the portion surrounding the discharge space, and a pair of main electrodes applied with a driving voltage and patterned on predetermined positions on the upper and/or lower substrates for inducing electric field in the discharge space, thereby generating plasma in the discharge space so as for visible light to be emitted from the phosphor as the ultraviolet ray emitted from the plasma excites the phosphor; and a driving apparatus for generating a priming discharge between the auxiliary electrode and at least one of the first electrode and the second electrode constituting the pair of main electrodes, and generating a main discharge between the first and second electrodes.

The flat light source apparatus further includes a protective layer made of MgO for protecting at least a portion of areas exposed to plasma in the discharge space and effectively generating a discharge by providing a large number of secondary electron emissions.

According to yet further aspect of the present invention, there is provided a flat light source structure, comprising: an upper substrate made of a light transmitting material; a lower substrate separated from the upper substrate by a distance; a barrier rib disposed between the upper and lower substrates to maintain the distance, thereby defining a discharge space filled with a discharge gas with a predetermined pressure; a phosphor coated on at least a portion of the inner surface of the upper and lower substrates, the portion surrounding the discharge space; and a pair of main electrodes applied with a driving voltage and patterned on predetermined positions on the upper and/or lower substrates for inducing electric field in the discharge space, thereby generating plasma in the discharge space so as for visible light to be emitted from the phosphor as the ultraviolet ray emitted from the plasma excites the phosphor; wherein white color is implemented by a combination of different phosphors having different center wavelengths, and at least one phosphor out of phosphors emitting two or more colors is separately coated on areas different from areas on which the other phosphors are coated, wherein the areas for at least two or more of the phosphors may be preferably different from each other.

According to yet further aspect of the present invention, there is provided a flat light source apparatus having a plurality of the above-mentioned flat light source structures arranged repetitively.

According to yet further aspect of the present invention, there is provided a flat light source apparatus comprising a plurality of the above-mentioned flat light source structures, which serves as a unit cell and arranged in a matrix form, in which the first electrodes and the second electrodes in the unit cells are connected in row or in column, thereby forming shared electrodes, and the first electrode in each unit cell is disposed nearer to the first electrode in the adjacent unit cell than the second electrode.

In the above-mentioned apparatus, auxiliary electrodes in the unit cells may be connected to each other in column or in row in the perpendicular direction to the connected main electrodes.

According to yet further aspect of the present invention, there is provided a driving method of the above-mentioned apparatus, comprising the steps of causing priming discharges in selected unit cells out of the plurality of unit cells, and causing main discharges in the selected unit cells.

The step of causing a main discharge can be implemented by alternately applying a voltage waveform having a repetitive pattern with a predetermined frequency and duty ratio to the first electrode and the second electrode, and the step of causing a priming discharge can be implemented by applying a voltage waveform having a predetermined pattern to each auxiliary electrode in the selected unit cells.

Alternatively, the step of causing a priming discharge may comprise applying a ground voltage to the first electrode and the second electrode in the plurality of unit cells.

Alternatively, the step of causing a main discharge may comprise respectively applying a voltage waveform having a repetitive pattern with a predetermined frequency and duty ratio to the first electrode and the second electrode in the plurality of unit cells, while the auxiliary electrodes in all of the unit cells are applied with a ground voltage.

Alternatively, the step of causing a priming discharge may comprise sequentially applying a first voltage waveform having a repetitive pattern to the auxiliary electrodes column by column or row by row in the plurality of unit cells, and applying a second voltage waveform having a repetitive pattern with a predetermined frequency and duty ratio to the first electrode and the second electrode in the selected unit cell row by row or column by column to which the first voltage waveform are applied during the periods in which the first voltage are applied.

The step of causing a priming discharge and the step of causing a main discharge can be repeatedly performed during predetermined periods according to the desired brightness level, wherein the predetermined time may be 1TV frame time.

Alternatively, the step of causing a priming discharge may comprise applying a third voltage which is a repetitive waveform synchronized with the first voltage waveform and the second voltage waveform applied to the first and second electrodes in the selected cells to auxiliary electrodes in the selected cells, wherein the auxiliary electrodes in the unit cells other than the selected unit cells may be applied with a ground voltage.

According to yet further aspect of the present invention, there is provided a flat light source structure wherein the auxiliary electrode is divided into a first auxiliary electrode and a second auxiliary electrode being parallel to the first electrode and the second electrode, respectively, of the main electrode pair.

In the flat light source structure above, a discharge of the flat light source structure is allowed to occur by connecting the first auxiliary electrode and the second auxiliary electrode to each other and prevented by connecting the first and second auxiliary electrode to their corresponding main electrodes respectively.

According to yet further aspect of the present invention, there is provided a method of driving the above flat light source apparatus comprising the steps of causing priming discharges in a selected cells out of the plurality of unit cells; and causing main discharges in the selected cells, wherein the first auxiliary electrode and second auxiliary electrode in unit cells other than the selected unit cells are applied with the same respective voltage waveforms applied to the first electrode and the second electrode.

BRIEF DESCRIPTION OF THE DRAWINGS

The above and/or other aspects and advantages of the present invention will become apparent and more readily appreciated from the following description of the exemplary embodiments, taken in conjunction with the accompanying drawings, in which:

FIGS. 29A to 29D illustrate a flat light source apparatus in which unit cells are arranged in the form of 2×3 and provide the respective separate auxiliary electrodes, and further illustrate an exemplary driving waveform, and discharge status;

FIGS. 30A and 30B illustrate a flat light source apparatus in which unit cells are arranged in the form of 2×3, and auxiliary electrodes are connected to each other in rows and illustrate a driving waveform used in this apparatus;

Figure 1:
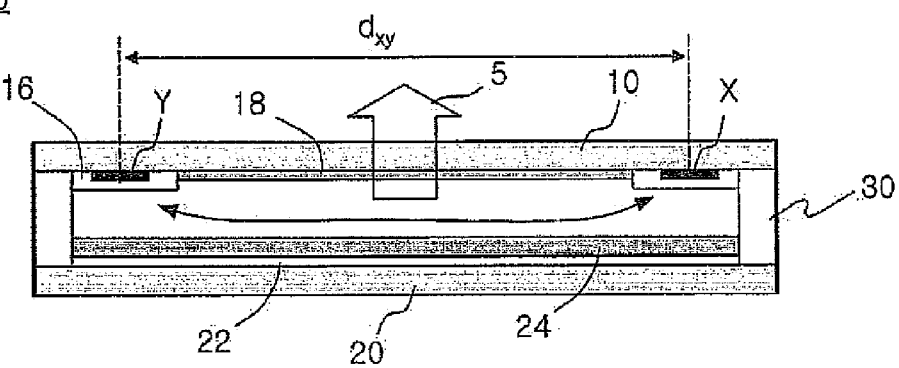
FIG. 1 is a schematic view of a conventional flat light source structure.
Figure 2:
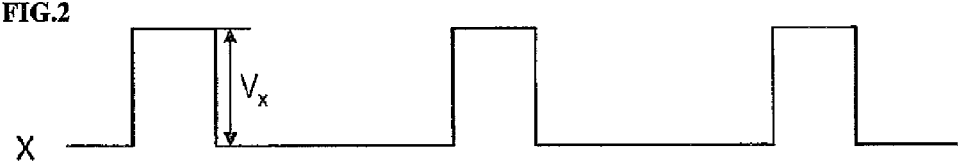
FIG. 2 is a schematic view for explaining a driving method of a conventional flat light source structure.
Figure 2:
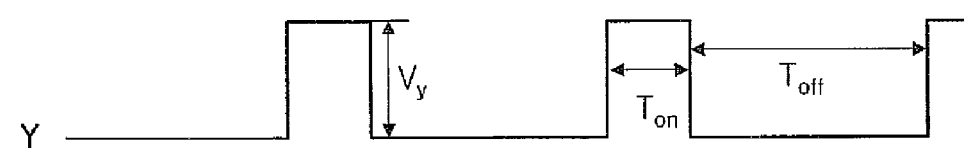
Figure 3:
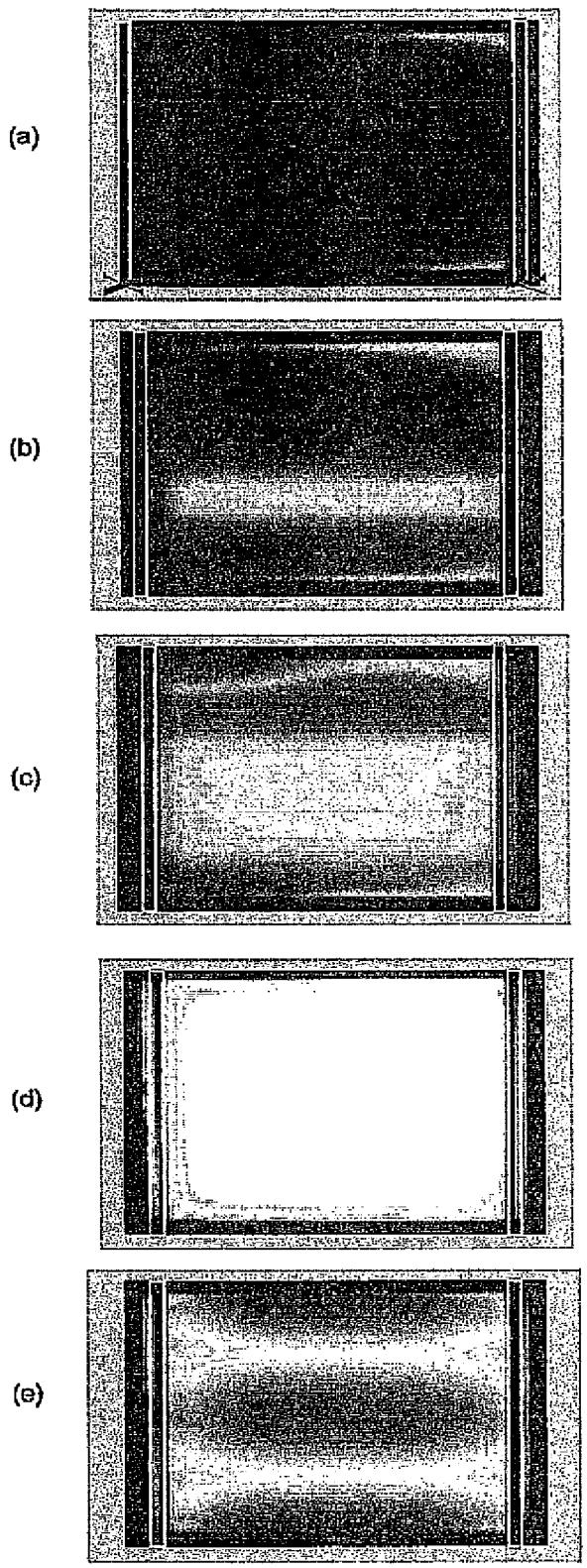
FIGS. 3(a) to 3(e) are views for illustrating the discharge procedure leading to contraction in a flat light source structure.

DETAILED DESCRIPTION OF THE ILLUSTRATIVE, NON-LIMITING EMBODIMENTS OF THE INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

Figure 4:
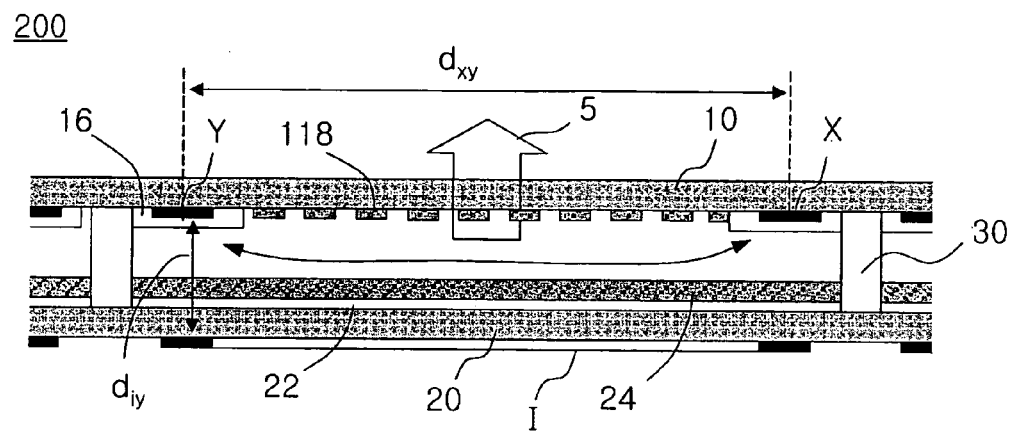
FIG. 4 is a schematic view of a flat light source structure according to an embodiment of the present invention.

FIG. 4 is a sectional view schematically illustrating a flat light source structure according to the present invention. The flat light source structure 200 according to the present embodiment includes an upper substrate 10, a lower substrate 20, and a pair of main electrodes X and Y formed on the inner surface of the upper substrate 10, and further includes an auxiliary electrode I on the outer surface of the lower substrate 20 in order to obtain a uniform whole surface discharge over the entire area. The auxiliary electrode I includes a parallel component which is parallel to the main electrodes X and Y formed on the inner surface of an upper substrate 10, and a perpendicular component which is perpendicular to the main electrodes X and Y and traverse across the main electrodes X and Y. The auxiliary electrode I can be formed on the lower substrate 20 as a predetermined pattern, and a distance $d_{iy}$ between the auxiliary electrode I and the main electrode is shorter than the distance $d_{xy}$ between the main electrodes X and Y.

Figure 5:
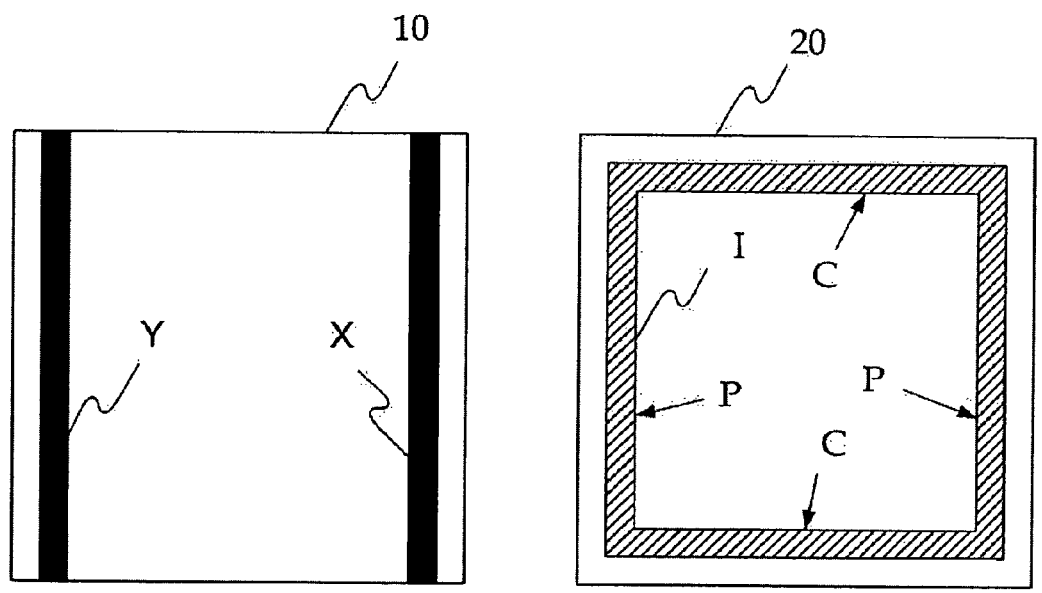
FIG. 5 illustrates the top view and the bottom view of electrodes used in a flat light source structure 200 according to the present invention.

FIG. 5 illustrates plan views illustrating electrodes used in the flat light source structure 200. On the outside of the structure, a discharge space is sealed by a predetermined sealing material, and the main electrode patterns X and Y in a straight line shape are formed on the upper substrate 10 to extend in the vertical direction. On the lower substrate 20 facing the upper substrate 10, the auxiliary electrode pattern I having a rectangular shape as a whole is formed. The pattern of the auxiliary electrode I is configured to surround the discharge space. The pattern of the auxiliary electrode I includes the parallel component P being parallel to the main electrode patterns X and Y and including a left component and a right component, and the perpendicular component C including an upper side and a lower side being perpendicular to the main electrode patterns X and Y and runs to traverse the main electrode patterns X and Y. The inventors of the present invention observed that the flat light source structure of the present invention can maintain uniform and stable discharges over the entire area of the flat light source, and the discharge contraction was inhibited remarkably.

Figure 6:
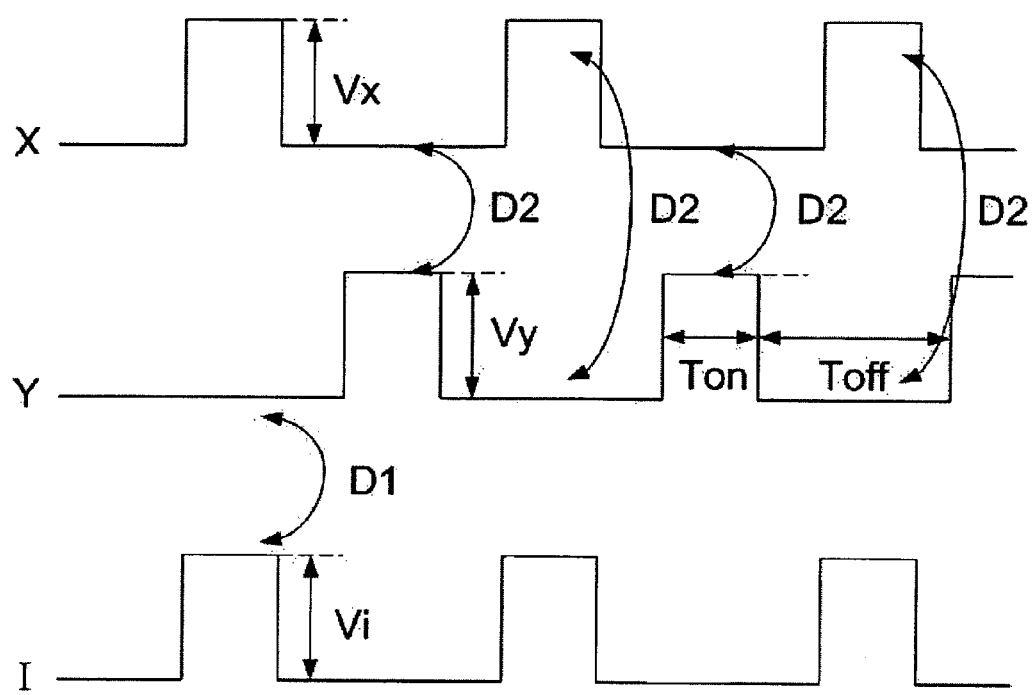
FIG. 6 is an exemplary voltage waveform used for driving the flat light source structure according to the present invention.

FIG. 6 illustrates exemplary voltage waveforms used for driving the flat light source structure of the present invention. The operation of the voltage waveform shown in FIG. 6 will be described below. A voltage higher than the discharge breakdown voltage is applied between the auxiliary electrode I and the second electrode Y by square waves constituting the driving waveform (D1). In the early stage of the operation of the flat light source, wall charges are not accumulated yet. As shown in FIG. 4, if the auxiliary electrode I is formed on the outer surface of the lower substrate 20, the intensity of electric field between the auxiliary electrode I and the main electrode Y can decrease. However, since the distance between the auxiliary electrode I and the main electrodes X or Y is shorter than the distance between the main electrodes X and Y and a high voltage drop occurs due to a dielectric layer having high dielectric constant, a discharge can be easily generated at a relatively low voltage. Further, after the priming discharge D1 (or local discharge) is generated once, the main discharges D2 (or long gap discharge or entire surface discharge) between the main electrodes X and Y are effectively induced by priming particles existing in the discharge space. That is, according to this embodiment of the present invention, the entire surface discharge is obtained due to the voltage (Vx, Vy) applied between the main electrodes X and Y, and the auxiliary electrode I is applied with square wave pulses synchronized with a voltage waveform applied to any one main electrode (X in the drawing) out of the main electrodes X and Y, wherein the voltage Vi applied to the auxiliary electrode can be the same as the voltage Vx applied to the main electrode X. In this case, at early stage, if a priming discharge is initiated between the auxiliary electrode I and the second main electrode Y, a neutral gas in the discharge space is turned into plasma and the plasma diffuses to a long discharge gap between the main electrodes X and Y, thereby giving the priming effect to the discharge in the long gap.

At this time, since the electric field induced between the main electrodes X and Y is stronger than electric field induced between the auxiliary electrode I and the second main electrode Y, the discharge between the auxiliary electrode I and the second main electrode Y is transferred into a discharge between the main electrodes X and Y. A driving voltage applied to the auxiliary electrode I formed at outer sides makes charged particles diffuse uniformly all over the entire surface, so that the entire surface discharge can stably expand, and the plasma is prevented from being contracted locally, resulting in stable glow discharge between the main electrodes. Such the auxiliary electrode and the driving voltage applied thereto expands the range where a stable discharge is generated over the whole surface of the flat light source as wide as possible.

Figure 7:
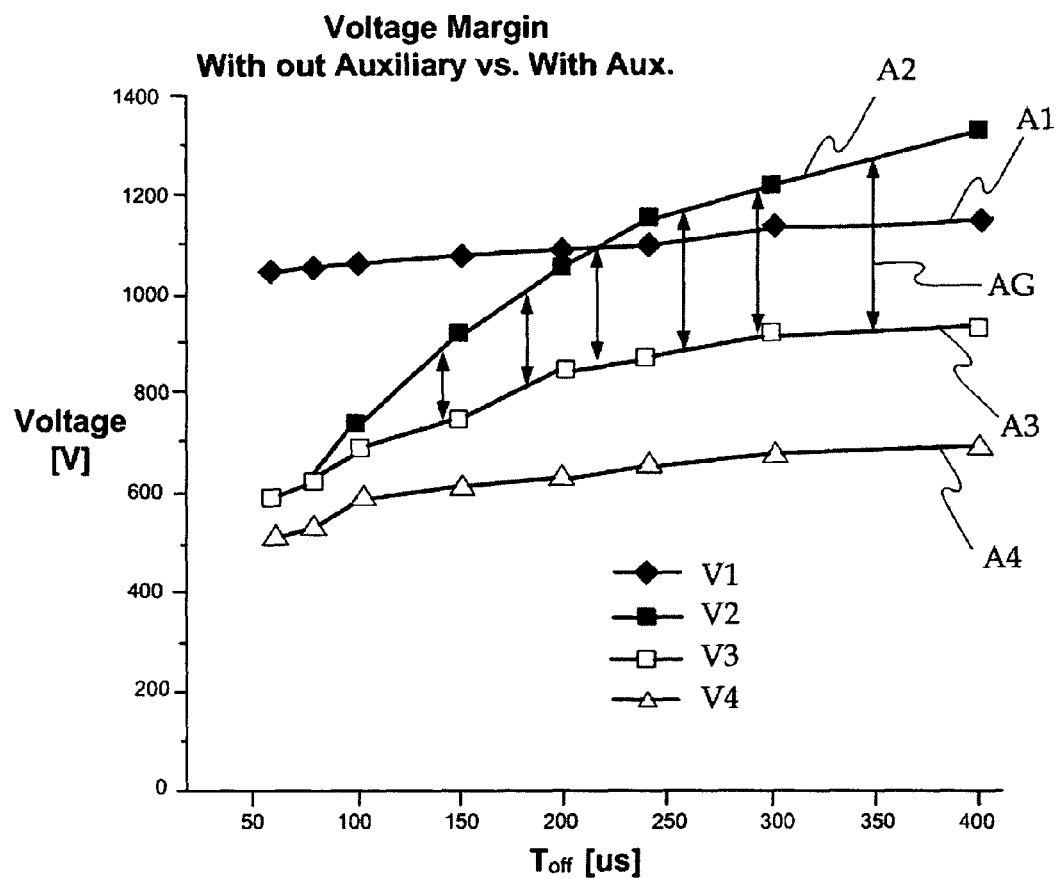
FIG. 7 shows the experimental results for comparing operational characteristics of a conventional flat light source structure and the present invention flat light source structure for the case that the on time Ton of the driving waveform is fixed to 1.5 us in a test panel (80 mm×80 mm in size, Ne—Xe 4%, and 60 Torr)

FIG. 7 illustrates the test result of respective operating characteristics of the conventional flat light source structure and the present invention flat light source structure, wherein the test is performed by using test panels with 80×80 mm² size at 60 Torr (Ne—Xe 4% discharge gas) and fixing the on-time Ton of the driving waveform shown in FIG. 6 to 1.5 microseconds. In the graph shown in FIG. 7, the curve A1 is the discharge contraction voltage V1 curve represented in the case in which there is no auxiliary electrode, a curve A2 is the discharge contraction voltage V2 curve of the flat light source structure according to the present invention, the curve A3 is the complete surface discharge initiating voltage or the fully diffused discharge voltage V3 curve of the flat light source structure according to the present invention, and the curve A4 is the priming discharge initiating voltage V4 curve of the flat light source structure according to the present invention.

As shown in FIG. 7, according to the conventional flat light source structure, the discharge is initiated at about 1080V with the frequency of 15 kHz or lower, and there is substantially no operational margin due to the discharge contraction instantaneously following the discharge starting. Further, the discharge breakdown voltage value increases as the frequency becomes lower (that is, Toff increases). Accordingly, a high voltage is applied between the main electrodes X and Y to start the discharge, the discharge contraction occurs simultaneously with the starting of the discharge. That is, a glow discharge is not generated uniformly over the entire surface, and the discharge becomes a low efficiency and high current discharge mode upon starting of discharge. As a result, it was found that a uniform discharge cannot be generated for the frequencies lower than 50 kHz in the conventional flat light source structure. The reason of the foregoing is thought that the discharge breakdown voltage is higher or equals to the voltage where the discharge contraction occurs in the flat light source structure used in the experiment. Further, according to the conventional driving method in which main electrodes are alternately applied with a voltage waveform, the operational margin area in which the stable glow discharge is repeatedly caused is not observed even if a predetermined pressure or a predetermined pulse condition is changed.

However, as shown in FIG. 7, when the present invention of flat light source structure operates under the same condition as in the operation of the conventional flat light source structure, the discharge breakdown voltage V3 is lowered compared to the conventional flat light source structures, and the difference between the discharge breakdown voltage V3 and the discharge contraction starting voltage V2 increases according to the decrease of the frequency. That is, the stable entire surface discharge is caused at the main discharge breakdown voltage V3, and is maintained until the voltage between the main electrodes reaches the discharge contraction starting voltage V2, so that a stable operation margin from the voltage V3 to the voltage V2 is ensured. Accordingly, in case of using the present invention flat light source structure, the operational voltage range where the whole surface discharge occurs is widened remarkably. In case that the frequency of the driving pulse is high (left side of the graph), the discharge contraction voltage is low, so that the range where the normal operation is possible is not observed. The area where the discharge contraction occurs at the same time as the turn-on is observed at 17 kHz or higher in case that 1.5 μs on time driving pulse is applied. In case that the width of the driving pulse is wide, since the current application time is increased, it is presumed that the discharge contraction starts at a lower voltage and a lower frequency because more power is concentrated in the discharge space.

Accordingly, in case of using the present invention of flat light source structure, the range of an operational condition under which the stable whole surface discharge can be effectively maintained and the discharge occurs at a sufficiently low voltage is widened. This is resulted from the uniform electric field induced in the discharge space by changing the distribution of electric field while the discharge is maintained by the auxiliary electrode formed to surround the periphery of the discharge space. FIG. 7 illustrates the operational range (AG) of a flat light source structure where the whole surface discharge occurs.

According to an embodiment of the present invention shown in FIG. 4, in order to increase the brightness and efficiency, a phosphor layer 118 is partially formed on the surface of an upper substrate 10 unlike the conventional phosphor layer formed on the entire surface of the upper substrate with a uniform thickness.

In order to optimize the thickness of the phosphor layer on the upper substrate 10, a square wave pulse of 1 kV and Ton/Toff: 2/120 μs is applied to a test panel manufactured under the condition of Ne—Xe 4% and 80 Torr, and the brightness is observed for various thickness of the phosphor layer on the upper substrate 10. The phosphors used in this experiment were as follows:

| Color | Phosphor |
|-------|----------|
| Red | $(Y, Gd)BO_3:Eu$ |
| Green | $Zn_2SiO_4:Mn$ |
| Blue | $BaMgAl_{14}O_{23}:Eu$ |

The grain size of the phosphors were about 2 to 6 μm. As a result of the experiment, when the thickness of the phosphor is about 6 μm similar with the grain size, the brightness was highest. The reason of the foregoing is thought that the phosphor is thin enough and thus sufficiently transmits visible light emitted from the lower substrate. Consequently, since the phosphor formed on the upper substrate should be capable of self-emitting as well as transmitting visible light emitted from the lower substrate 20 through the front surface of a panel, a too much thick phosphor layer is not desirable and the thickness of phosphor layer should be as thin as the grain size.

Figure 8:
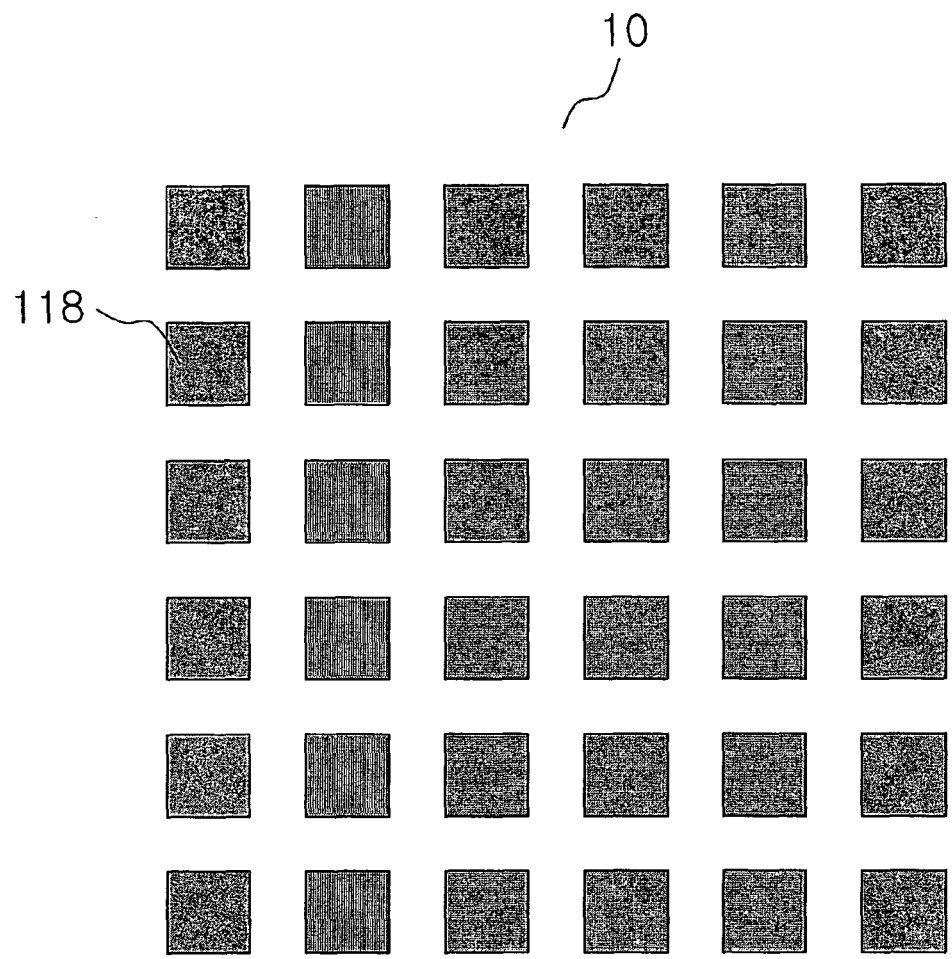
FIG. 8 is a view illustrating a pattern of a phosphor layer formed on the upper substrate.

In order to obtain higher brightness and efficiency by improving the structure of the phosphor layer on the upper substrate 10, the phosphor layer is made to be uneven in thickness over the entire area unlike conventional technologies. It is preferable that the phosphor layer is formed by a screen printing to a thickness of about 6 μm as a predetermined pattern as shown in FIG. 8. In performing the screen printing, the printed phosphor volume is made as small as possible to form a thin phosphor layer with a thickness corresponding to one grain size. Some characteristics of flat light source structures with and without the phosphor layer 118 on the upper substrate 10 are shown in the following table.

| | Brightness ($cd/m^2$) | Efficiency (lm/W) |
|---|---|---|
| Phosphors both on upper and lower substrates | 2000 | 40 |
| Phosphor on lower substrate only | 850 | 18 |

As shown in the table, when the thickness and structure of the phosphor on the upper substrate 10 is optimized, brightness and efficiency are two times higher than those of the structure without the phosphor on the upper substrate 10. It could be understood by people skilled in the art that the pattern of the phosphor layer 118 is not limited to the pattern shown in FIG. 8 and may be an arbitrary pattern which is formed non-uniformly depending on its locations on the surface, for example the partially overlapping circular dots.

Figure 9:
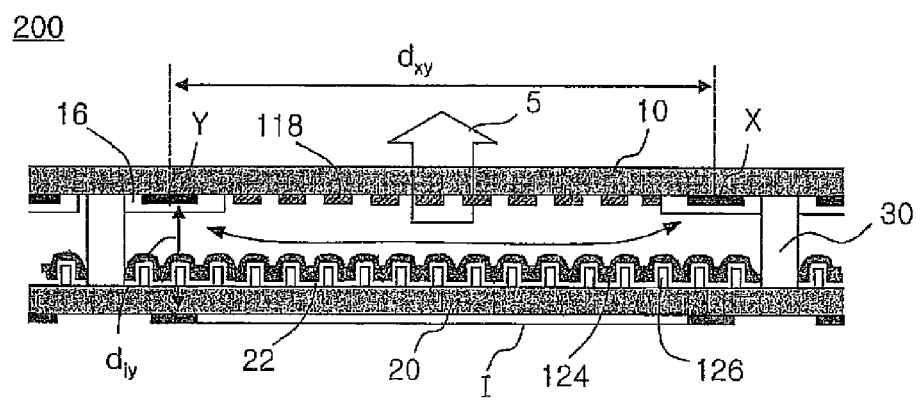
FIG. 9 is a sectional view illustrating a lower substrate 20, in which the surface structure of the lower substrate 20 is improved to increase the thermal and mechanical strength of a phosphor layer and prevent separation of the phosphor layer.

FIG. 9 illustrates a flat light source structure according to an embodiment of the present invention, in which the surface structure of a lower substrate 20 is improved to increase the thermal and mechanical strength of the phosphor layer on the lower substrate 20 and prevent the separation of the phosphor layer from the lower substrate 20. In this embodiment, lots of micro barrier ribs 126 are formed on the lower substrate 20 having barrier ribs 30 thereon, and a reflection layer 22 and a phosphor layer 124 are formed to cover the micro barrier ribs 126. As a result, the phosphor layer 124 is reinforced in thermal and mechanical strength and the surface area thereof is increased, so that the brightness and efficiency are enhanced.

Figure 10:
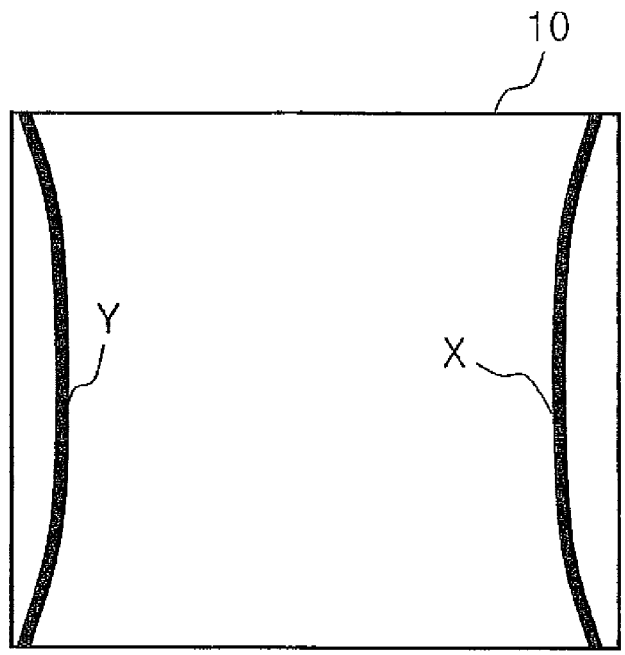
FIG. 10 is a plan view illustrating modified main electrodes used in the present invention flat light source structure.

FIG. 10 illustrates a modified pattern of the main electrodes used in the flat light source structure according to the present invention. The main electrodes X and Y are not necessary to be a straight line, and its shape may diversely vary to be a curved pattern or a crooked line. In particular, the main electrodes X and Y are not necessary to be a circular pattern even if the upper substrate and the lower substrate are circular as in lightings.

Figure 11:
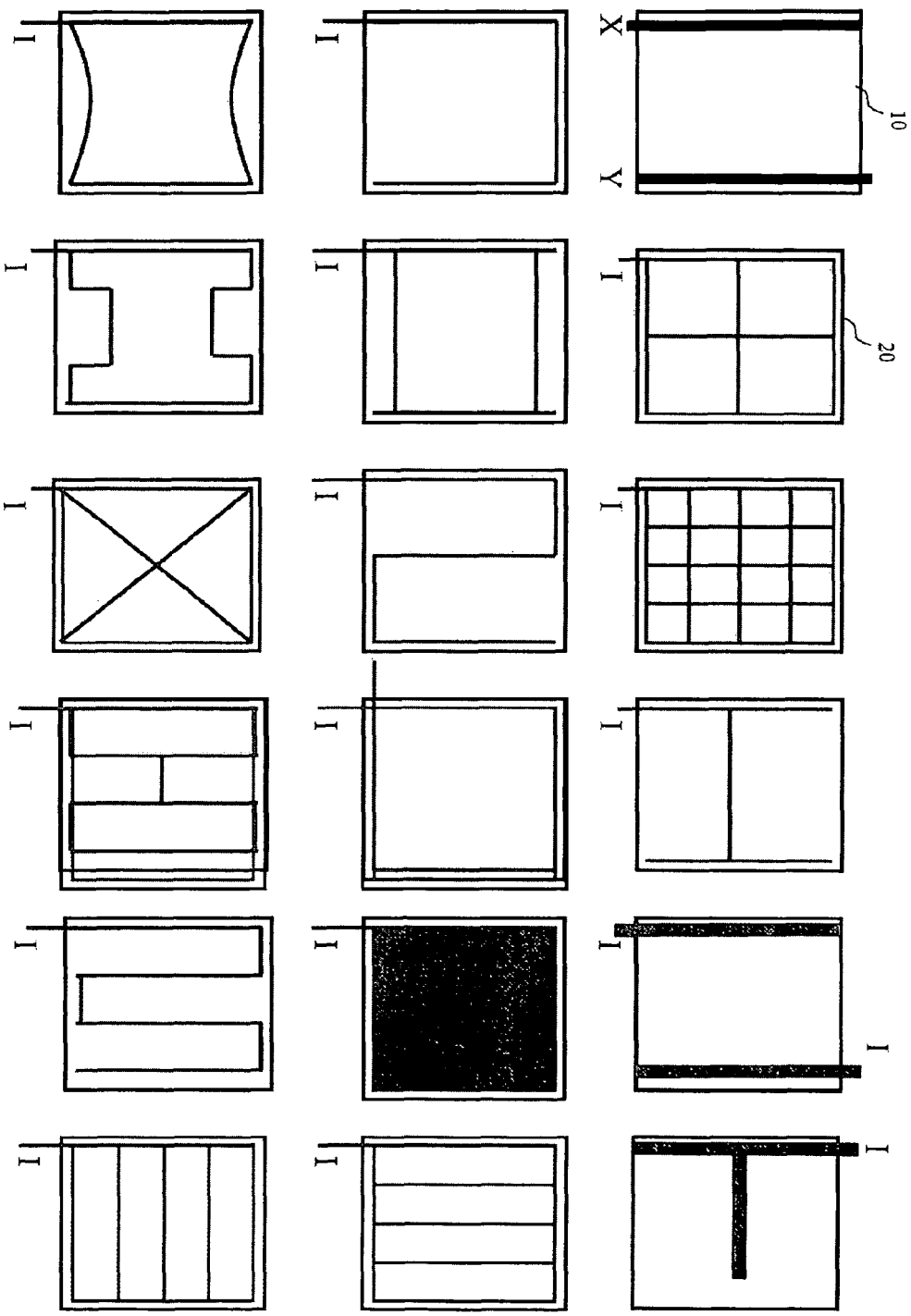
FIG. 11 shows various patterns of an auxiliary electrode included in the present invention flat light source structure.

FIG. 11 illustrates a variety of auxiliary electrode patterns used in the flat light source structure according to the present invention. In the flat light source structure according to the present invention, the auxiliary electrode is not necessary to be a straight line and includes parallel components which is parallel with any one of the main electrodes X and Y facing to each other, and perpendicular components (parts C in the auxiliary electrode I in FIG. 5) which traverses across the main electrodes X and Y The auxiliary electrode is formed to surround at least a part of the periphery of a discharge space between the main electrodes X and Y The auxiliary electrode is not necessary to be a closed loop pattern surrounding completely the discharge space. Here, the parallel component of the auxiliary electrode, being in parallel with any one of the main electrodes, participates in discharge starting mainly, and the perpendicular component of the auxiliary electrode serves to inhibit the discharge contraction, contributing to discharge equalization. As long as the auxiliary electrode I acts as such, it is not necessary that the auxiliary electrode I has a rectangular pattern as a whole. As shown in FIG. 11, the auxiliary electrode I may be a curve shape, a lattice shape, a polygon shape, a shape including a curved component, or an inside-filled polygon shape with a predetermined area as a whole. The auxiliary electrode I can comprise two or more segments being separated from each other, in which the separated auxiliary electrodes can be symmetric or asymmetric.

Figure 12:
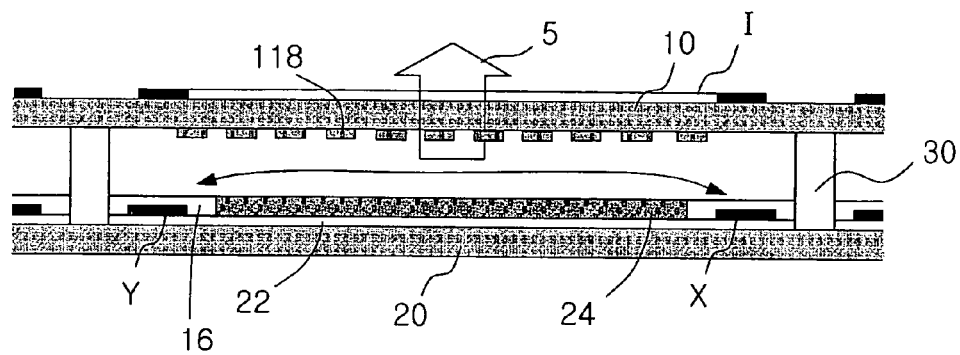
FIGS. 12 to 15 are sectional views illustrating positions of main electrodes and auxiliary electrode according to diverse examples of the present invention.
Figure 13:
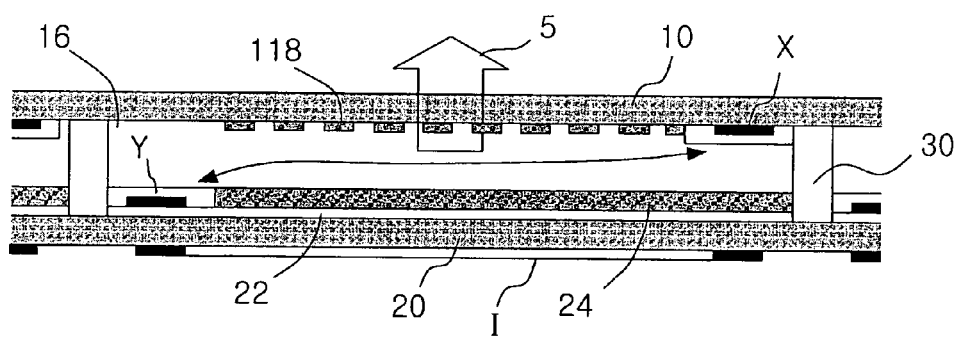
Figure 14:
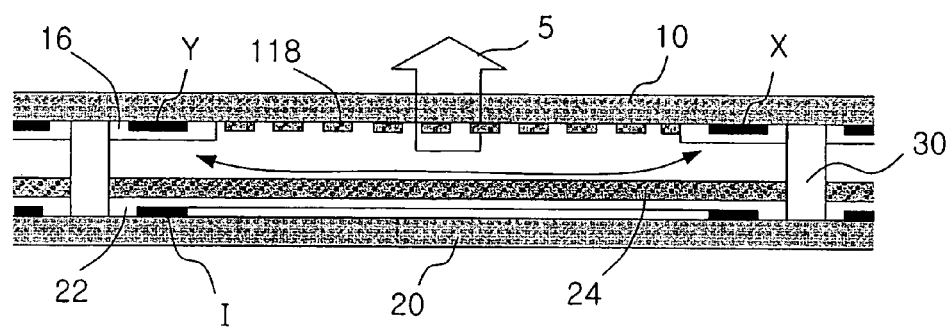
Figure 15:
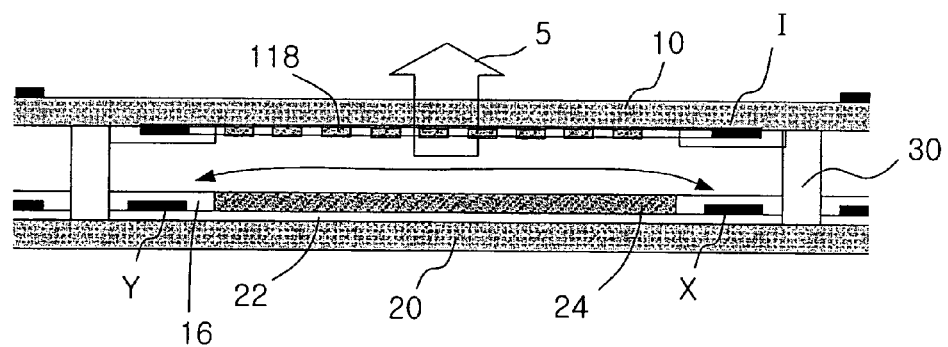

FIGS. 12 to 15 illustrate a variety of positions of the auxiliary electrode and main electrodes. As shown in FIG. 12, the main electrodes X and Y are formed on the inner surface of the lower substrate 20 and the auxiliary electrode I can be formed on the outer surface of the upper substrate 10. On the other hand, as shown in FIG. 13, the two main electrodes X and Y are formed on the inner surfaces of the upper substrate 10 and the lower substrate 20, separately and the auxiliary electrode I may be formed on the outer surface of any one of the upper or lower substrates 10 and 20. Furthermore, the auxiliary electrode I can be formed on the inner surface of the lower substrate 20 or upper substrate 10 as shown in FIGS. 14 and 15 and also can be formed on the sidewall as a conductive pattern instead of the surfaces of the upper substrate or the lower substrate. In the case in which the auxiliary electrode I is formed on the outer or inner surface of the upper substrate 10 as shown in FIGS. 12 and 15, the auxiliary electrode I is preferably a transparent electrode made of a light transmitting conducting material.

The flat light source structure of the present invention may further include a protective layer made of MgO to prevent the damage from being caused to the phosphor layer, the surface of glass substrate, the surface of electrodes, the dielectric layer covering the electrodes by plasma generated in the discharge space. The protective layer can be coated on the entire surface inside the discharge space, or coated locally wherever necessary. The protective layer can extend the lifespan of a flat light source structure and serve to stabilize the discharge by promoting the emission of secondary electrons.

Figure 16A:
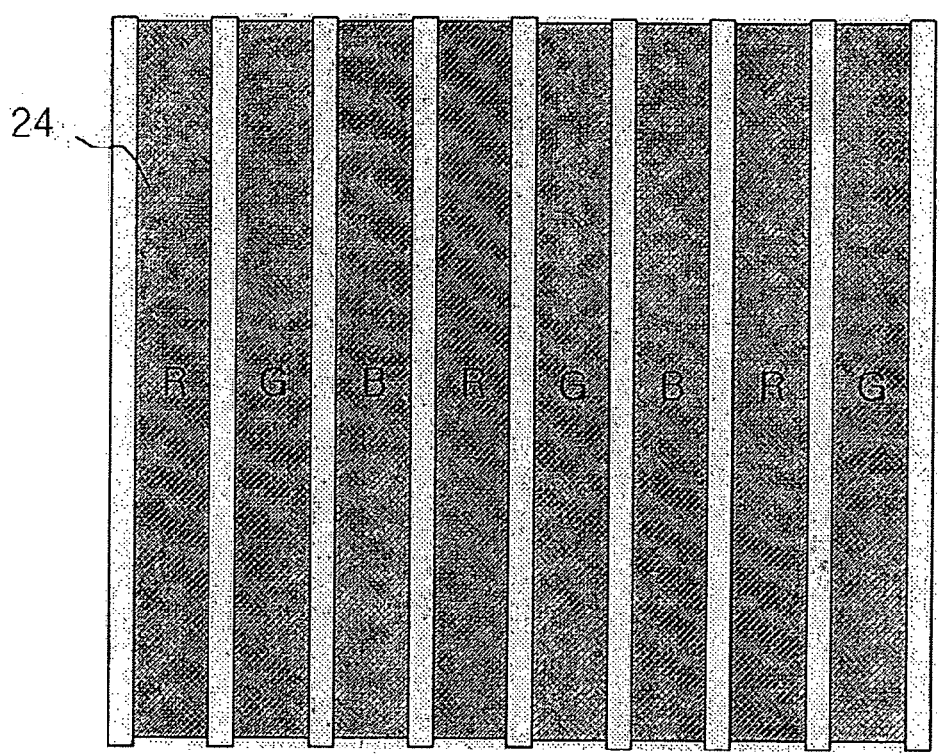
FIGS. 16A and 16B are diverse examples of the pattern of the RGB phosphor layer formed on the lower substrate of the present invention flat light source structure.
Figure 16B:
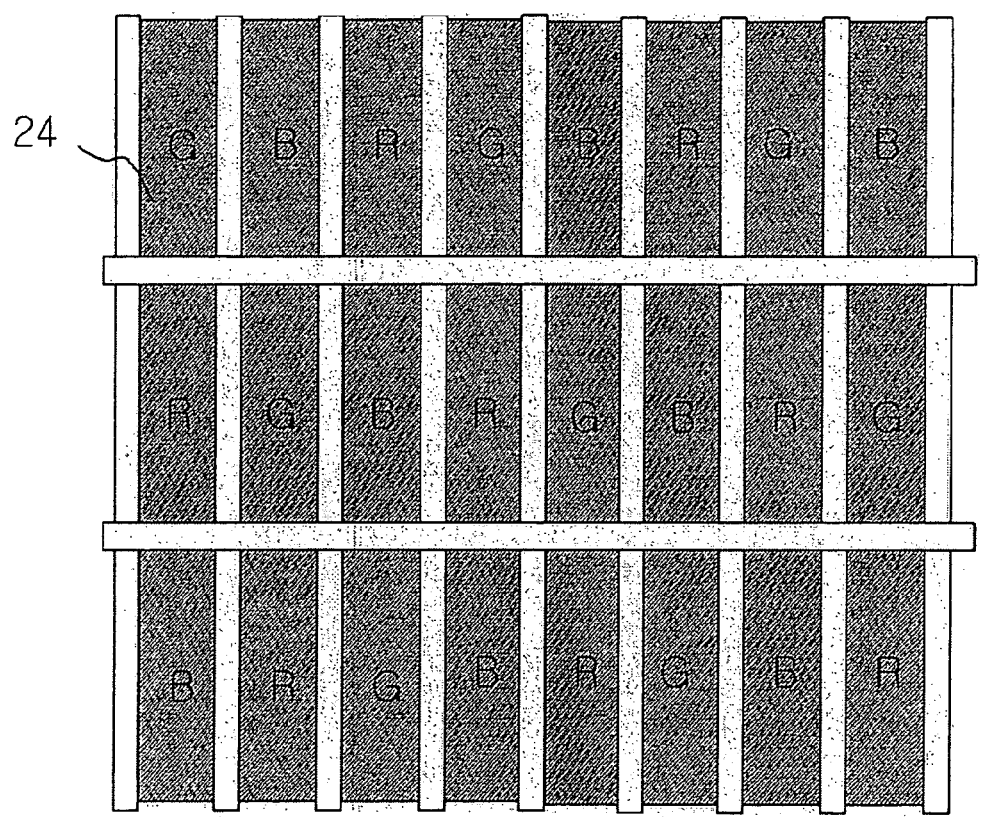

The phosphor used in the flat light source is a phosphor mixture including red, blue and green phosphors having light-emitting characteristics of different center wavelengths and exhibits typically high color rendering white. However, since the green G phosphor having a high specific gravity exists in such a white phosphor, when the phosphor is formed to be a thick layer, the color purity may be degraded due to the settlement of the green G phosphor. In order to overcome such a problem, the phosphor layer 24 coated on the lower substrate with a thick layer can be realized by separately formed repetitive patterns of red R, green G, and blue B phosphors. The white color can be implemented by the color mixture of the separately formed different phosphors. FIG. 16A and FIG. 16B illustrate a variety of exemplary phosphor patterns according to the present invention. By the phosphor layer as shown in FIGS. 16A and 16B, color purity degradation caused due to the settlement of the green G phosphor in the phosphor mixture coated on the entire surface can be improved.

In this case, barrier ribs with a proper height can be formed between the phosphor areas. Further, the phosphor mixture can be made of phosphors excluding the green G phosphor and the phosphor mixture is coated with a proper pattern, and only the green phosphor can be formed on different areas by a separate pattern.

The voltage waveform shown in FIG. 6 for driving the flat light source structure according to the present invention may be diversely modified.

Figure 17:
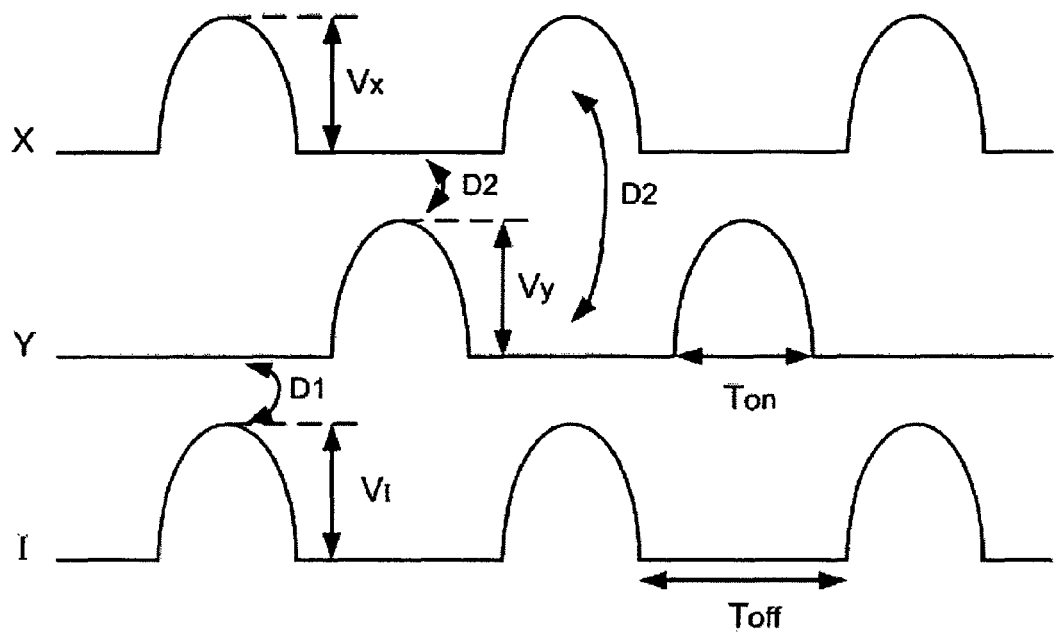
FIGS. 17 to 21 are diverse exemplary voltage waveforms used for driving the flat light source structure according to the present invention.

FIG. 17 illustrates an exemplary voltage waveform used to drive the flat light source structure according to the present invention. The voltage waveform in FIG. 17 is not square waves but is half-wave rectified sine waves. The waveform can be triangle waves, ramp waves, and so on.

FIGS. 18 to 21 illustrate another exemplary voltage waveforms used for driving the flat light source structure according to the present invention.

Figure 18:
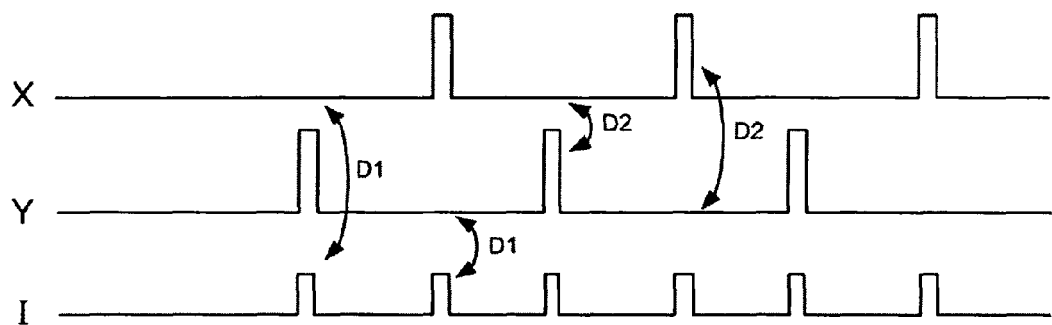

According to the embodiment shown in FIG. 18, the auxiliary electrode I is applied with a square wave synchronized with a square wave alternately applied to the main electrodes X and Y According to this embodiment, the voltage difference for causing a priming discharge is generated by the potential difference between voltages used to cause the main discharge. That is, the potential difference is induced by floating the auxiliary electrode I. This method is called a floating method. If pulses of a predetermined voltage pattern are applied to the main electrodes while the auxiliary electrode I is floated, a potential difference is caused between the auxiliary and main electrodes facing each other by pulses applied to any one of the main electrodes. This potential difference causes a priming discharge D1 between the auxiliary electrode I and any one of the main electrodes, and the priming discharge is then developed as the entire surface discharge D2 even if the same pulses are applied.

Figure 19:
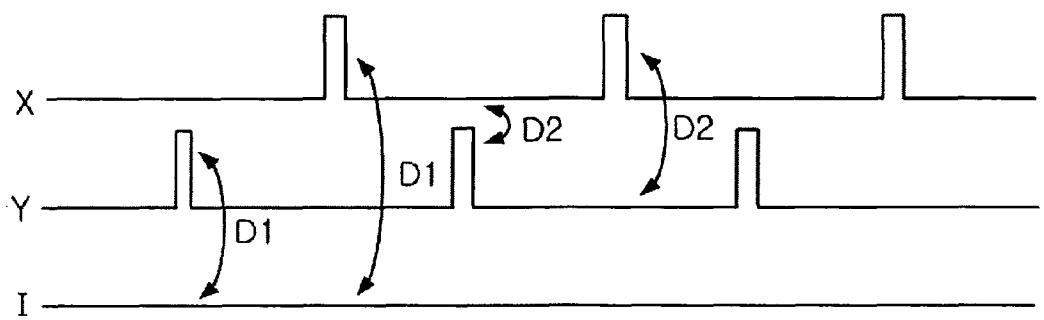

According to the embodiment shown in FIG. 19, the auxiliary electrode I is applied with a ground voltage, and voltage pulses are applied between the main electrodes. This method is called "grounding method" hereinafter. According to this embodiment, thanks to the voltage difference between the ground voltage applied to the auxiliary electrodes and the voltage pulse applied to the main electrodes, a priming discharge D1 is caused at an early stage, and the priming discharge D1 then develops to the entire surface discharge D2 as the voltage increases.

Figure 20A:
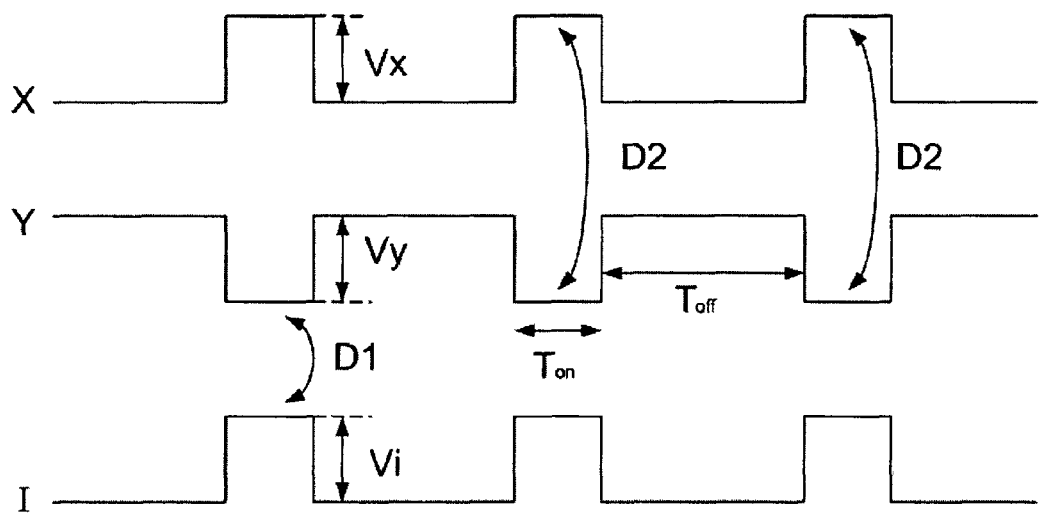
Figure 20B:
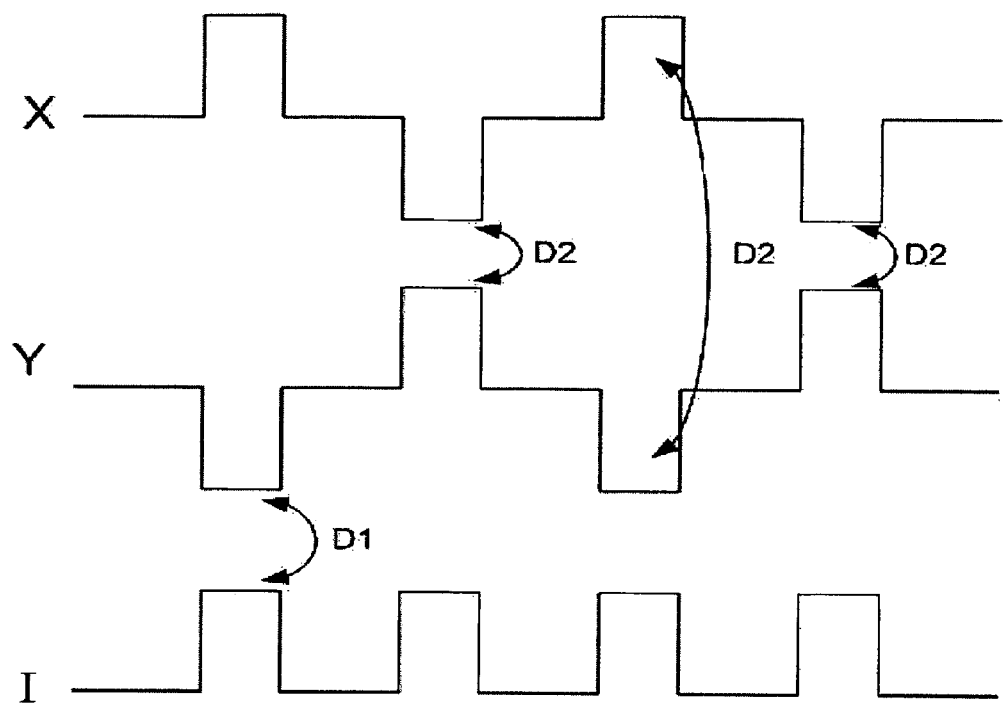

FIGS. 20A and 20B illustrate the voltage waveforms applied to the main electrodes X and Y, and the auxiliary electrode I, in which all of the voltage waveforms are synchronized with each other. Referring to FIG. 20A, the voltage waveforms applied to the main electrode X and the auxiliary electrode I are positive pulses having respective amplitudes $V_x$ and Vi, but the voltage waveform applied to the main electrode Y is negative pulses having an amplitude $V_y$, unlike the embodiment shown in FIG. 6. The voltage waveforms shown in FIG. 20B are different from those shown in FIG. 20A in an aspect that positive pulses and negative pulses are alternately applied to the main electrodes. The bipolar-type voltage waveforms shown in FIGS. 20A and 20B have the advantage of having smaller amplitude than those of the voltage waveforms shown in FIG. 6.

Figure 21:
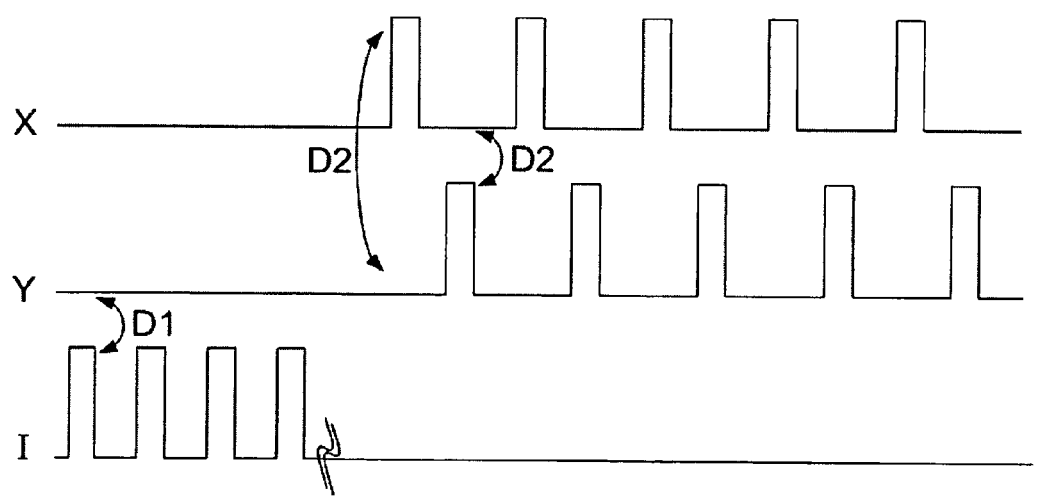

According to an embodiment shown in FIG. 21, before pulses shown in FIG. 21 are alternately applied to the main electrodes X and Y, the auxiliary electrode I is applied with a predetermined voltage waveform in advance. Accordingly, a priming discharge D1 is caused before driving pulses are applied to the main electrodes, and an entire surface discharge D2 is then caused due to the driving pulses applied to the main electrodes while the auxiliary electrode is kept grounded. In this case, bipolar-type voltage waveforms shown in FIGS. 20A and 20B can be applied to the main electrodes X and Y.

However, it is understood by people skilled in the art that a variety type of voltage waveforms other than the voltage waveforms shown in FIGS. 17 to 21 can be used in order to give a priming effect to a long discharge gap between the main electrodes X and Y by causing a priming discharge between the auxiliary electrode I and the main electrode(s) X and/or Y.

Here, the voltage characteristic of the discharge caused in the flat light source structure according to the present invention changes according to the cases that the auxiliary electrode is applied or is not applied with a voltage. Further, the discharge voltage changes according to the discharge gas condition, and the discharge gap. According to test results, the entire surface discharge is stably caused under the condition of Ne—Xe (4%) 140 Torr when using the driving waveform shown in FIG. 6, but is stable under the condition Ne—Xe (18%) 100 Torr when using the driving waveform shown in FIG. 17. Accordingly, it is understood by people skilled in the art that if these characteristics are properly utilized, the entire surface discharge generation can be controlled by the priming discharges in the specified range of voltage applied to the main electrodes.

Figure 22:
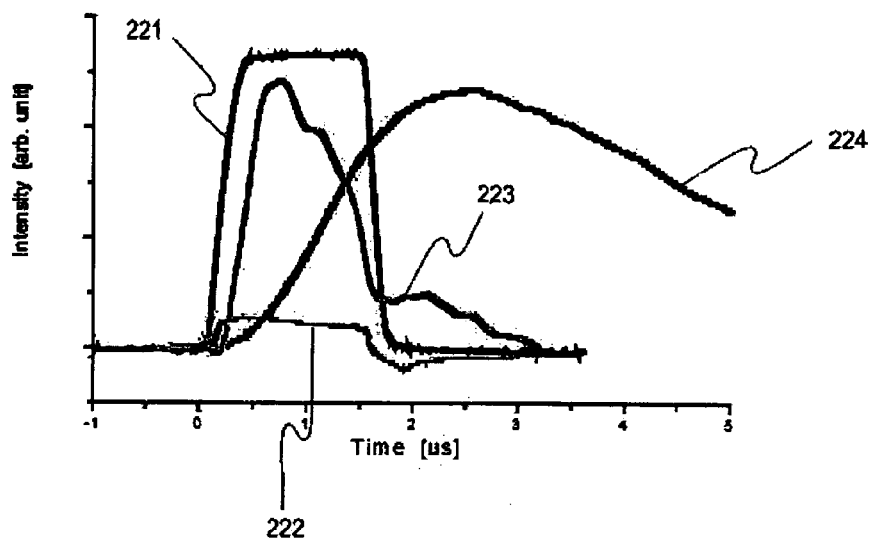
FIG. 22 is a view illustrating a discharge voltage waveform when using the flat light source structure according to the present invention, discharge current according to the discharge voltage waveform, an IR waveform, and a visible light waveform.

The conventional flat light source apparatuses using Mercury have a delay time in the range of several seconds when emitting visible light after applying the discharge voltage pulse due to Mercury pressure variation. Further, the apparatus has the disadvantage that the apparatus need to be preheated until the Mercury pressure becomes stabilized before fully lighting the apparatus. Further, in the case of displaying image signals, it is difficult to turn off the apparatus or to operate the apparatus varying application power in short time (for example, 1 TV frame time corresponding to 16.67 milliseconds) according to the image signals to be displayed. However, since the flat light source structure according to the present invention uses a gas mixture containing Xe as the discharge gas, the flat light source structure has a short response time, so that it is possible to emit visible light within several hundreds of nanoseconds upon application of voltage pulse. FIG. 22 illustrates the discharge voltage waveform 221 when using the flat light source structure according to the present invention, the discharge current 222 flowing between the main electrodes, an IR waveform 223 and a waveform of visible light 224. Referring to FIG. 22, light 223 of the IR wavelength of about 830 nanometers that indicates the emission of vacuum ultra violet rays having wavelength of 147 nanometers which excites phosphor is observed in 400 nanoseconds after applying the voltage pulse, and visible light rays 224 having blue wavelength (480 nanometers) is then emitted in one microsecond after that. Accordingly, in case of using the above-mentioned characteristic of the flat light source structure according to the present invention, it is possible to actively adjust brightness of TV image signals by varying application power in the units of TV frame time. Further, in the case in which brightness of a lamp used in a backlight is adjusted to be lowered according to TV image signals, and the transmittance of the liquid crystal display (LCD) is adjusted to be increased, the low gray scale level of expression can be improved while maintaining the brightness of the front surface of the LCD, and also the dark room contrast ratio can be enhanced.

FIGS. 23 to 25 illustrate methods of adjusting brightness, called dimming, by varying application power.

Figure 23A:
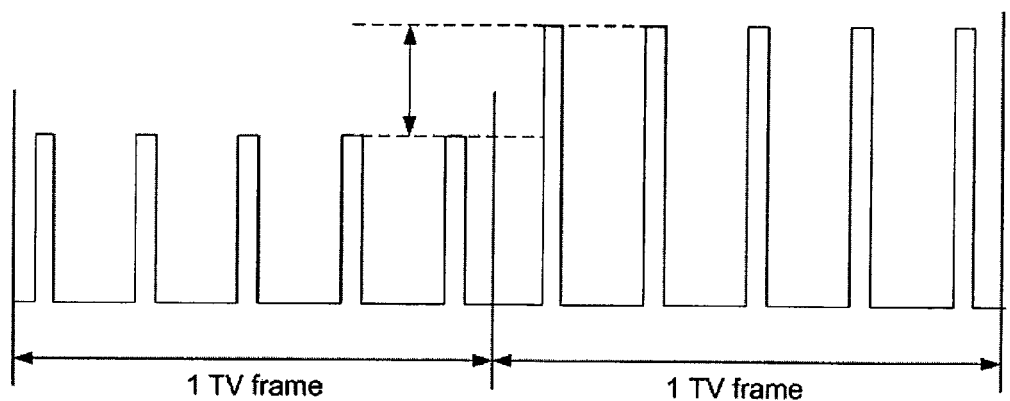
FIGS. 23A to 23B are views illustrating a method of adjusting brightness by varying the voltage of a driving pulse.
Figure 23B:
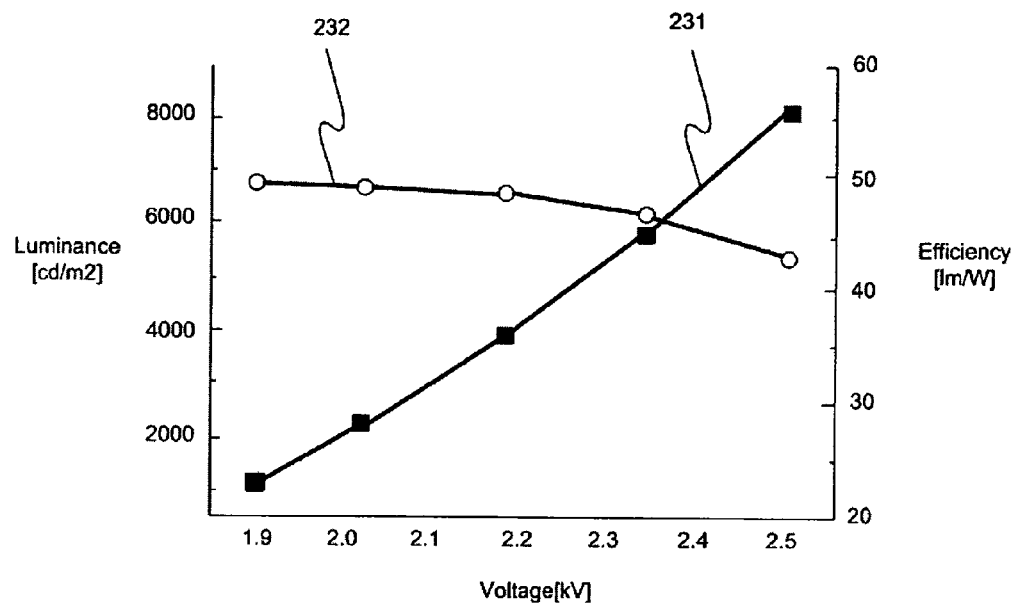

In the flat light source structure according to the present invention, it is possible to adjust brightness in case of driving the flat light source structure by varying the voltage level of the driving waveform having a fixed frequency and a fixed voltage pulse width as shown in FIG. 23A. FIG. 23B illustrates the test result of brightness and discharge efficiency which is represented by curves 231 and 232 respectively when varying the voltage level from 1.9 kV to 2.5 kV. The luminous efficiency and power consumptions of the lowest and highest brightness are shown in the following table.

|          | Brightness (cd/m²) | Efficiency (lm/W) | Power consumption (W) |
|----------|---------------------|--------------------|------------------------|
| Lowest   | 1120                | 50                 | 0.45                   |
| Highest  | 8150                | 43                 | 3.7                    |
| Ratio (%) | 13.7               | —                  | 12.2                   |

As shown in FIG. 23B, when using the flat light source structure according to the present invention, it is possible to adjust the brightness of the entire surface discharge with a dimming ratio (ratio of the lowest brightness to the highest brightness) of 14% or greater. The method of adjusting brightness using the voltage difference of the driving pulses can be used to actively improve the gray scale expression capability according to TV images in a TFT-LCD TV. Further, as the brightness can be adjusted, image distortion caused due to the long response time or degradation of contrast ratio being caused by leakage of backlight can be reduced. Further, since it is possible to adjust the amount of light emission according to the level of brightness of image signals, power consumption can be reduced, resulting in improvement of energy efficiency.

Figure 24A:
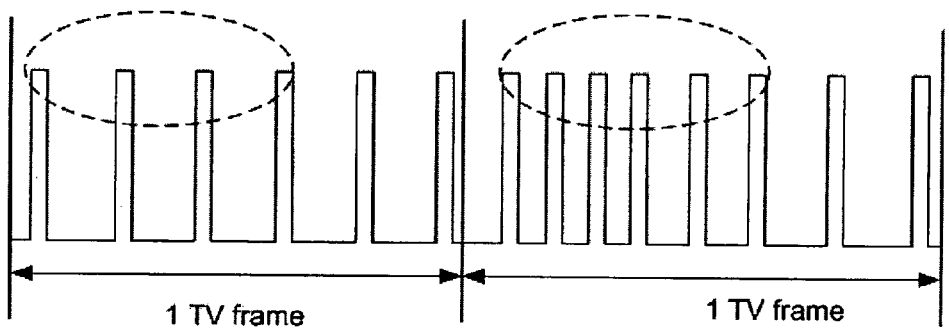
FIGS. 24A and 24B are views illustrating a method of adjusting brightness by varying the number of driving pulses.
Figure 24B:
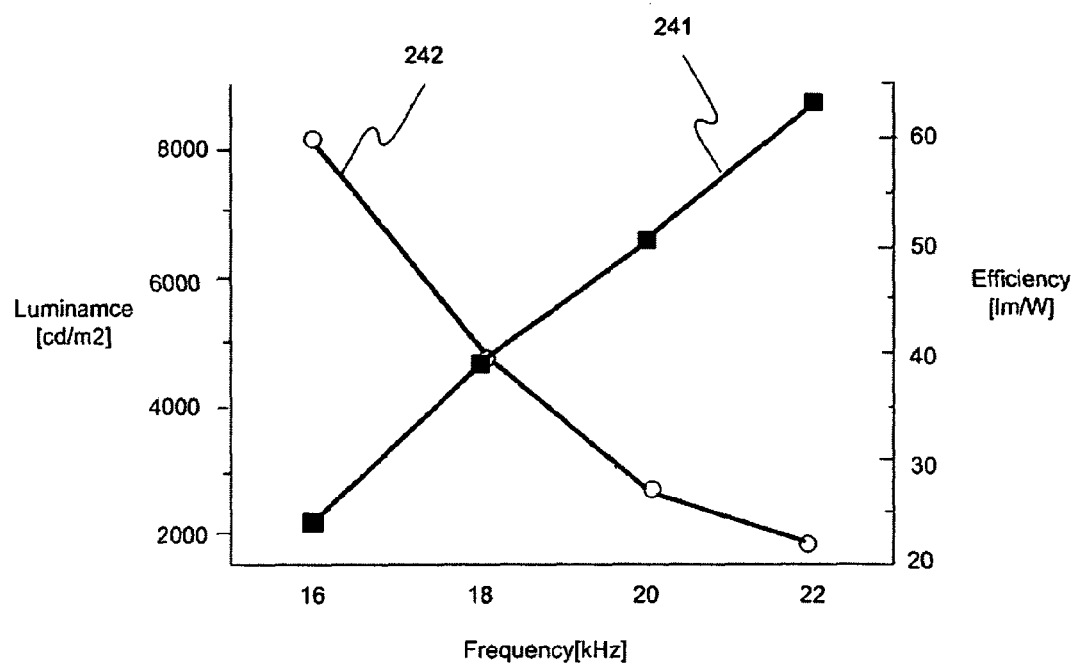

FIGS. 24A and 24B illustrate an exemplary method of adjusting brightness by varying the number of driving pulses applied to electrodes.

The period of the voltage pulses applied in the driving period of the flat light source structure is preferably in the range of 40 to 200 microseconds, and the period corresponds to about ¼₀₀~⅒₀ of 1 TV frame time of TV image signals. Accordingly, brightness of the still image frame having predetermined brightness can be adjusted by varying the number of driving pulses. While the voltage level and the pulse width are fixed for the entire driving time, FIG. 24A and FIG. 24B show the test result of the brightness and the discharge efficiency when varying the number of pulses by curves 241 and 242 respectively. The luminous efficiency and power consumptions of the lowest and highest brightness are shown in the following table.

| Comparison | Brightness (cd/m²) | Efficiency (lm/W) | Power Consumption (W) |
|------------|---------------------|--------------------|------------------------|
| Lowest     | 2180                | 60                 | 0.73                   |
| Highest    | 8700                | 22                 | 7.5                    |
| Ratio (%)  | 25                  | —                  | 10                     |

As shown in FIG. 24B, the dimming ratio becomes about 25% when using the flat light source structure according to the present invention and varying frequencies from 16 kHz to 22 kHz. As shown in FIG. 24A, the frequencies can be varied in a manner such that a large number of pulses is applied during the early period in one TV frame time, 16.67 milliseconds, and a smaller number of pulses is applied during the later period. In this case, the brightness is adjusted by varying the total number of pulses applied during one TV frame.

If the pulses are synchronized with the TV image signals, the dimming ratio can be more improved further because there are resting period in the TV image signals. The brightness control method using the variation of the number of pulses also can greatly reduce the power consumption by decreasing the power applied to a light source apparatus according to the image with low brightness, thereby also improving TV image qualities.

Figure 25A:
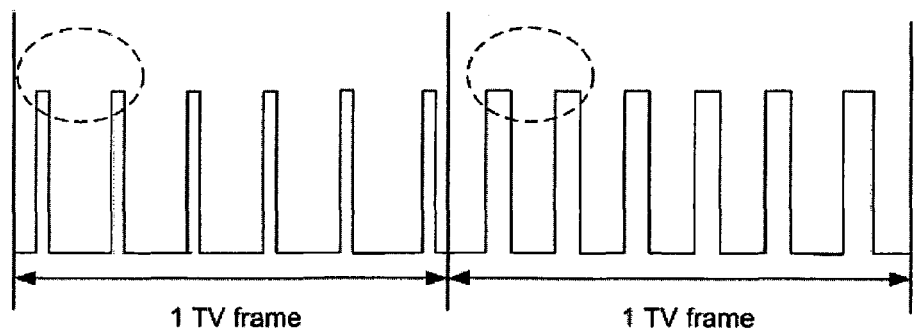
FIGS. 25A and 25B are views illustrating a method of adjusting brightness by varying the width of a driving pulse, that is, the duty ratio.
Figure 25B:
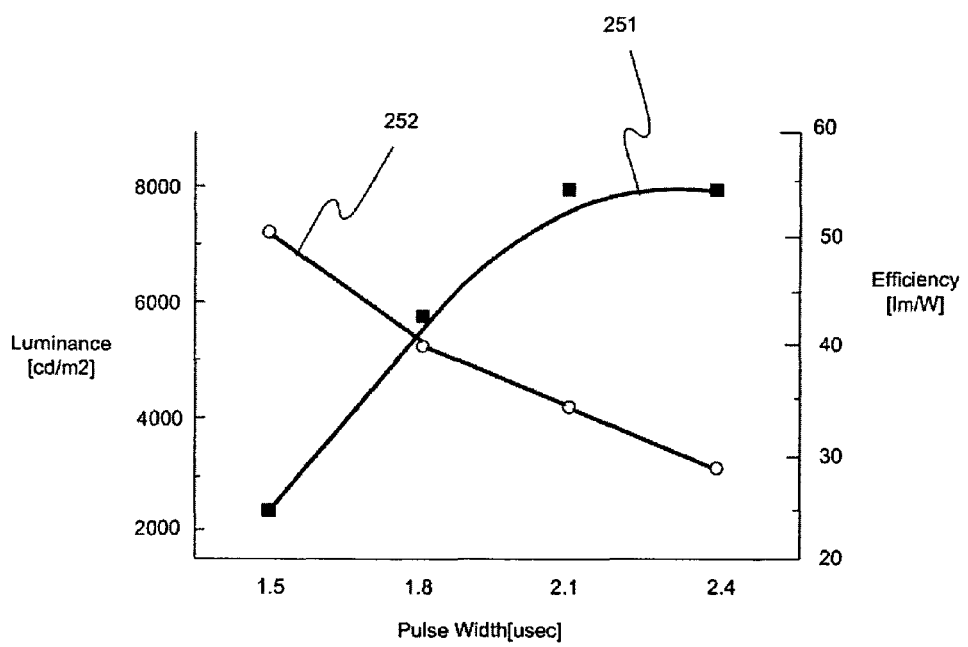

FIGS. 25A and 25B illustrate an exemplary method of adjusting brightness through the variation of driving pulse width, that is, duty ratio.

The voltage pulse width applied to the flat light source structure in a driving period can vary in the range from 1.5 to several microseconds. If the driving pulse width increases in the predetermined time, the power consumed by the gas discharge increases, so that intensity of discharge is enhanced. The brightness can be adjusted through the change of the discharge intensity. FIG. 25B shows the test result of the brightness and the discharge efficiency obtained through the variation of the width of driving pulses as shown in FIG. 25A, in which the brightness and the discharge efficiency is represented by respective curves 251 and 252. The luminous efficiency and power consumptions of the lowest and highest brightness are shown in the following table.

| Comparison | Brightness (cd/m$^2$) | Efficiency (lm/W) | Power Consumption (W) |
|---|---|---|---|
| Lowest | 2450 | 51 | 0.96 |
| Highest | 7960 | 29 | 5.3 |
| Ratio (%) | 30 | — | 18 |

As shown in FIG. 25B, the dimming ratio of about 30% is obtained when varying the width of driving pulses in the range from 2.4 to 1.5 microseconds in the flat light source structure according to the present invention. Since the above-mentioned brightness adjustment can be achieved by varying the width of pulses for each TV frame or in a single TV frame, it is possible to reduce the power consumption and to improve the quality of TV images by improving the low gray scale expression capability.

As described above, it could be understood that brightness and power consumption can be adjusted to be different from frame to frame by varying at least one of the amplitude of driving pulses, the number of driving pulses, or the width of driving pulses. Further, the voltage waveforms used in the driving method and the dimming method described above are the square pulses, but different type of a driving waveform such as a half-wave rectified sinusoidal wave or a bipolar wave in which negative and positive pulses are alternating can be used.

Figure 26A:
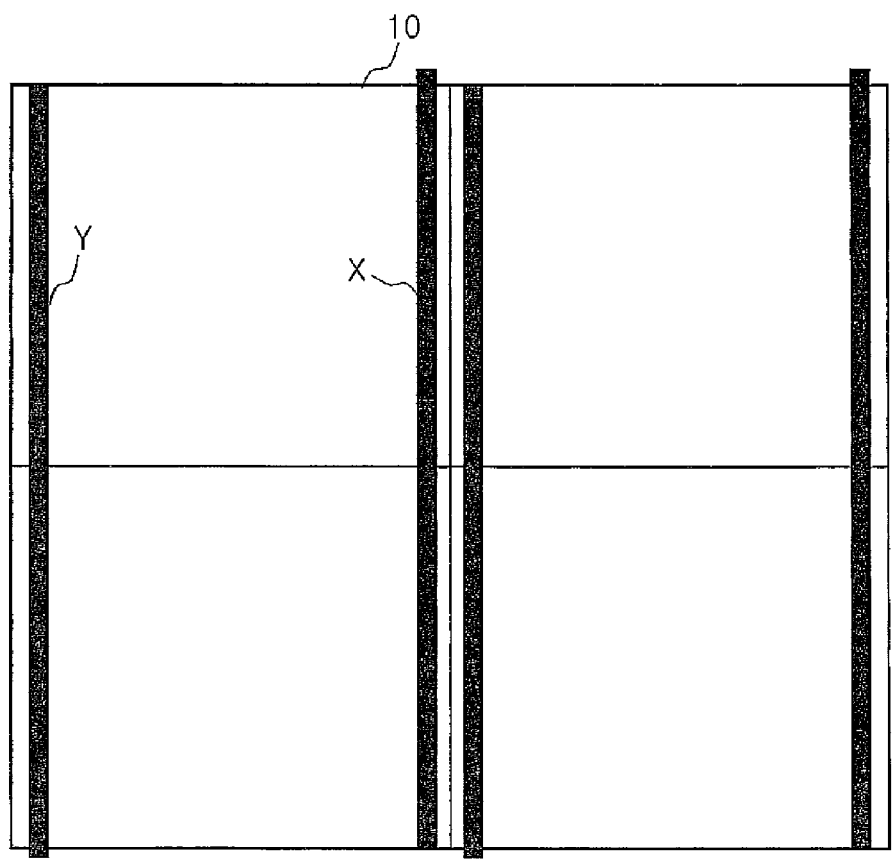
FIGS. 26A and 26B illustrate the arrangement of the upper substrate and the lower substrate in the case in which the flat light source structures, each acting as a unit cell, are arranged in a matrix form of 2×2 in order to implement a large flat light source apparatus.
Figure 26B:
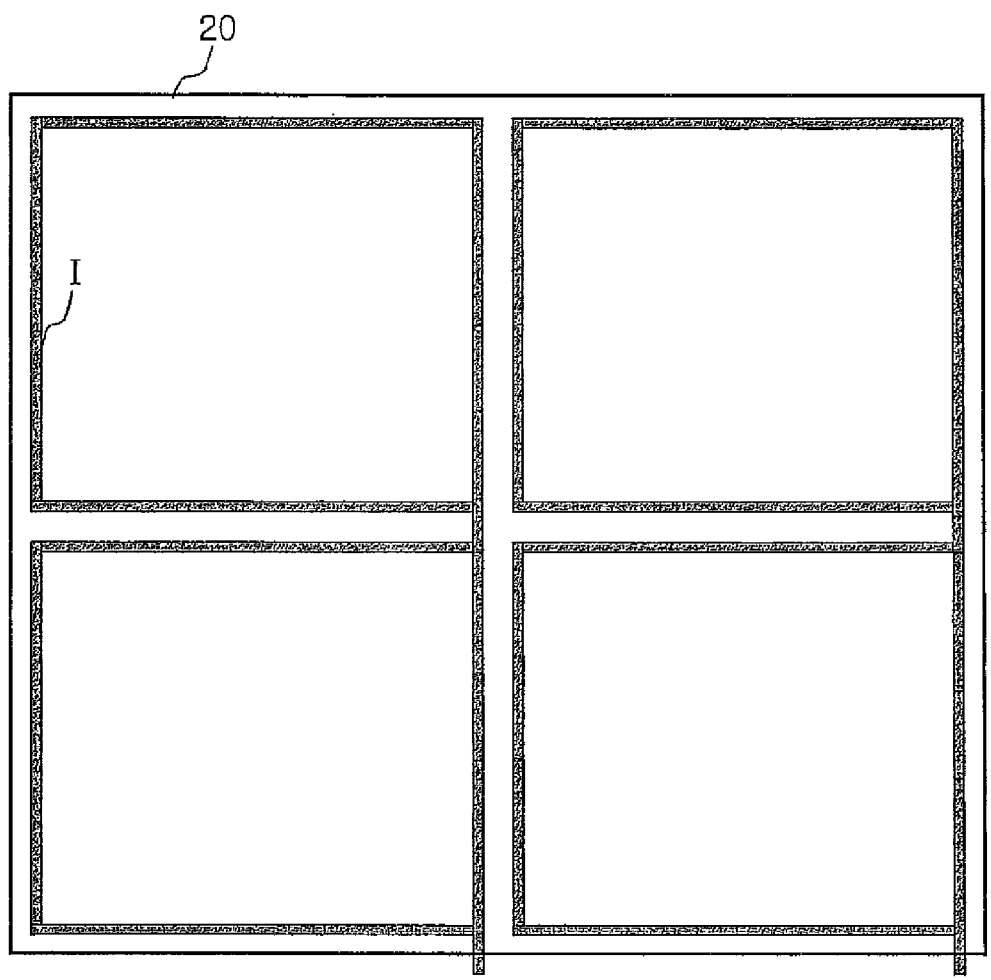

A large-sized flat light source apparatus can be easily implemented by arranging a plurality of the above-mentioned flat light source structures. That is, a large-sized flat light source apparatus can be realized by using the above-described flat light source structures as the basic unit cell. FIGS. 26A and 26B illustrate the arrangement of electrodes on the upper and lower substrates, in which the flat light source structures having respective unit cell structures are arranged in a matrix form of 2×2 in order to realize a large-sized flat light source apparatus. The flat light source structures serving as the repeating unit cells can be manufactured on one large-sized substrate at the same time, or can be separately manufactured and are then connected. In order to integrate the flat light source structures, known combining means such as an adhesive or resin can be used.

Figure 27:
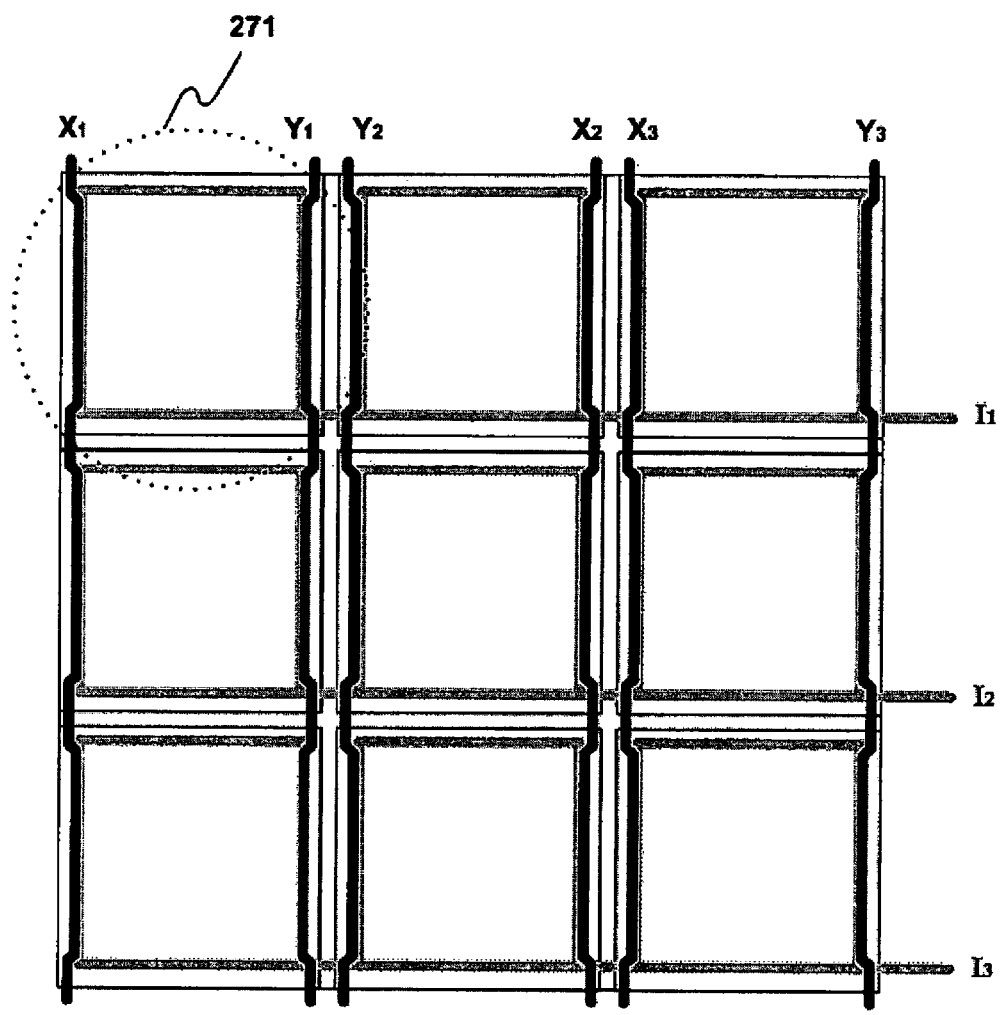
FIG. 27 illustrates an exemplary multi-cell flat light source apparatus comprising a plurality of flat light source structures arranged in a matrix form of 3×3.

FIG. 27 illustrates a multi-cell flat light source apparatus according to one embodiment of the present invention, in which the flat light source structures according to the present invention are arranged in a matrix form of 3×3.

Referring to FIG. 27, the flat light source apparatus according to the present invention comprises a pair of main electrodes $X_1$ and $Y_1$ for each cell, extending to adjacent cells in columns (or in rows), for causing a discharge, and an auxiliary electrode $I_1$ for each cell, extending to adjacent cells in rows (or in columns). The first electrode $X_2$ and the second electrode $Y_2$ of main electrodes $X_2$ and $Y_2$ preferably positioned next to the first electrode $X_3$ and the second electrode $Y_1$ in the adjacent cells respectively. Each unit discharge cell (discharge area) 271 is defined by barrier ribs (spacers) for limiting the discharge area, and the barrier ribs establishes the discharge space between an upper substrate and a lower substrate. The barrier ribs divides the discharge area into discharge cells but is formed in a manner such that they have open areas so that all the cells become under the same gas condition when exhausting or injecting the discharge gas. The cross-section of the barrier ribs has a trapezoid shape in which the upper end in the direction of emission of visible light rays is relatively narrow and the lower end on the bottom of the substrate is relatively wide. Accordingly, if a phosphor is formed on the surfaces of the barrier ribs, efficiency of using the side surface of the barrier ribs and reflective efficiency of visible light are enhanced.

The above-mentioned flat light source apparatus is constructed in a manner such that the discharge gap (the distance between main electrodes X and Y) becomes larger near the barrier ribs by the curved electrode pattern, and the thickness of a dielectric layer varies locally, thereby reducing plasma loss, resulting in improved discharge efficiency. Further, it is possible to reduce the possibility of discharge disturbance between neighboring discharge spaces. By using the basic structure having the above-described discharge characteristic as the unit cell and arranging the structures in rows and columns on a substrate, a large-sized light source apparatus can be implemented.

The discharge for each cell (unit lamp) constituting the multi-cell flat light source apparatus has different discharge characteristics whether the auxiliary electrode is used or not. That is, the discharge in the case of having a long discharge gap requires a relatively high discharge breakdown voltage in the case of without using a priming discharge caused by the auxiliary electrode in comparison with the case of using a priming discharge. In the case of using a priming discharge, a discharge is initiated at a relatively low discharge breakdown voltage due to the charged particles and wall charges.

Figure 28:
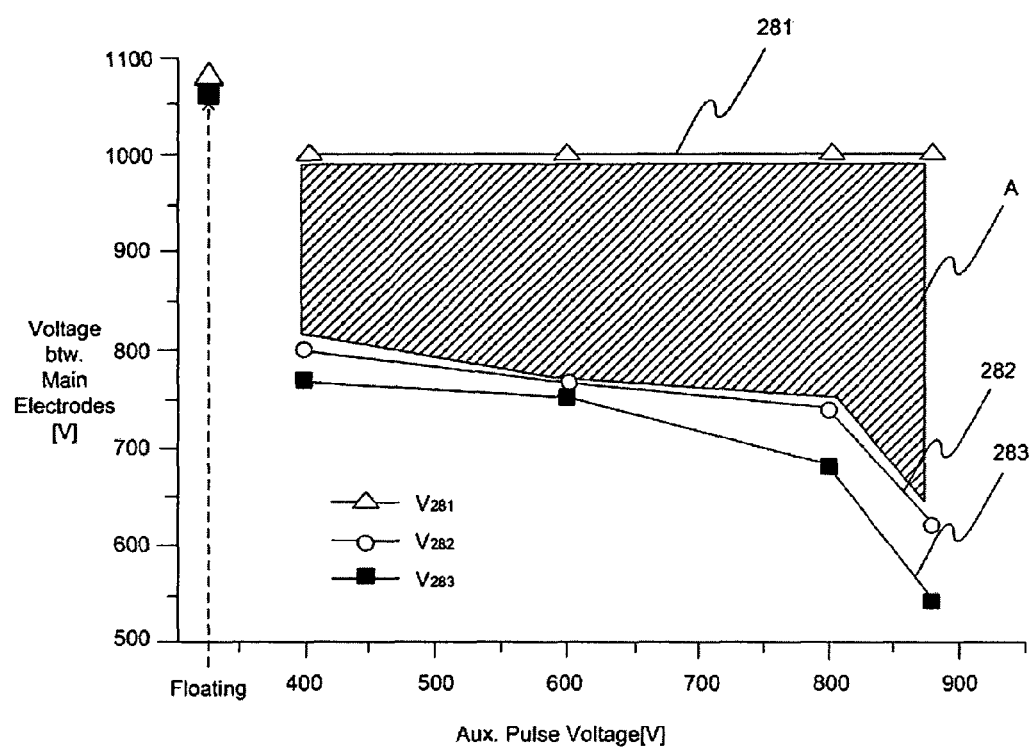
FIG. 28 is a graph illustrating the change of discharge firing voltages applied to the main electrode when increasing the voltage applied to the auxiliary electrode.

FIG. 28 is the graph showing the change of voltages between the main electrodes at which the entire surface discharge is started as the voltage applied to the auxiliary electrode increases. The graph shows the discharge contraction voltage curve 281 showing discharge contraction voltages $V_{281}$, the entire surface discharge voltage curve 282 showing entire surface discharge voltages $V_{282}$, and the auxiliary discharge voltage curve 283 showing auxiliary discharge voltages $V_{283}$. Referring to FIG. 28, in the case of applying no discharge signals to the auxiliary electrode, the entire surface discharge is started at a relatively high voltage, with an immediate contraction. However, in the case of deploying a priming discharge, there is a voltage margin (slanted area A in FIG. 28) for the entire surface discharge. As the priming discharge is caused at higher voltage, the entire surface discharge margin between the main electrodes becomes larger. Even though such characteristics changes according to the composition and the partial pressure of discharge gas, it is possible to selectively induce the entire surface discharge by selectively inducing the priming discharges.

A selective areal driving method of the multi-cell flat light source apparatus will be described below.

Figure 29A:
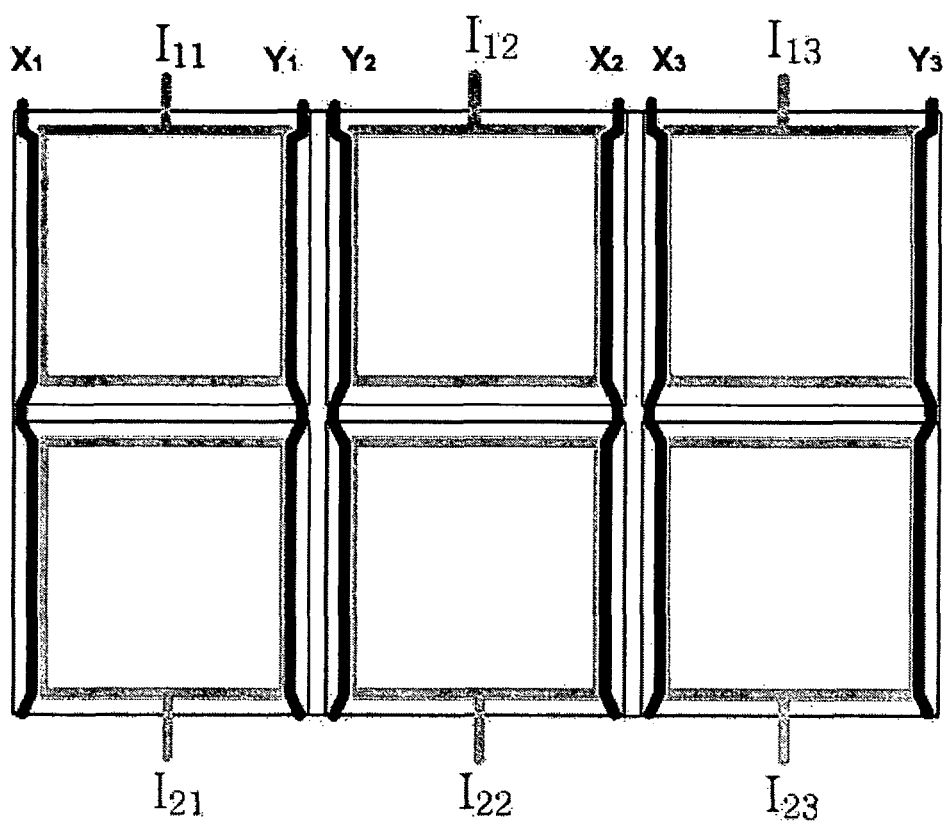
Figure 29C:
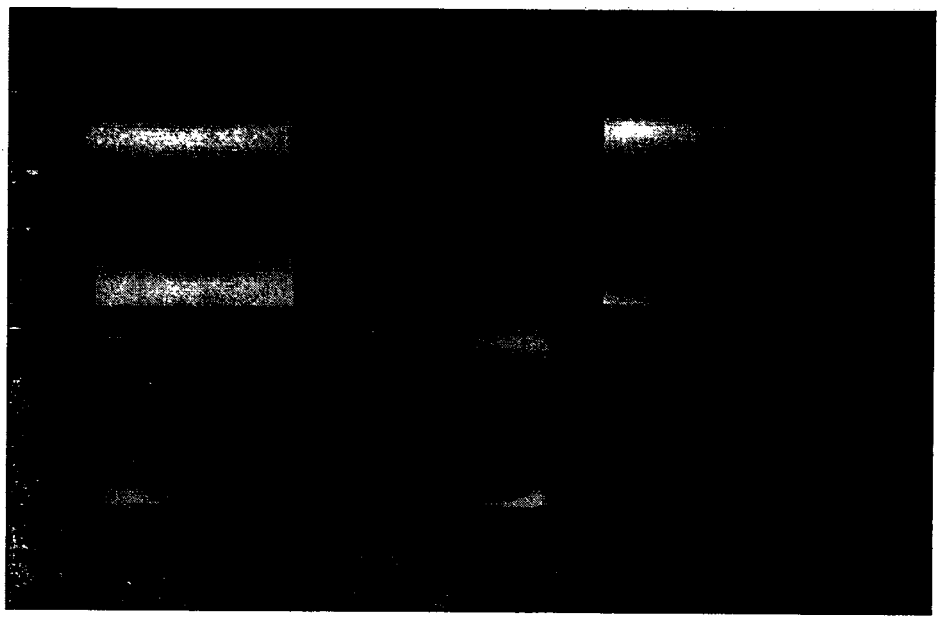
Figure 29D:
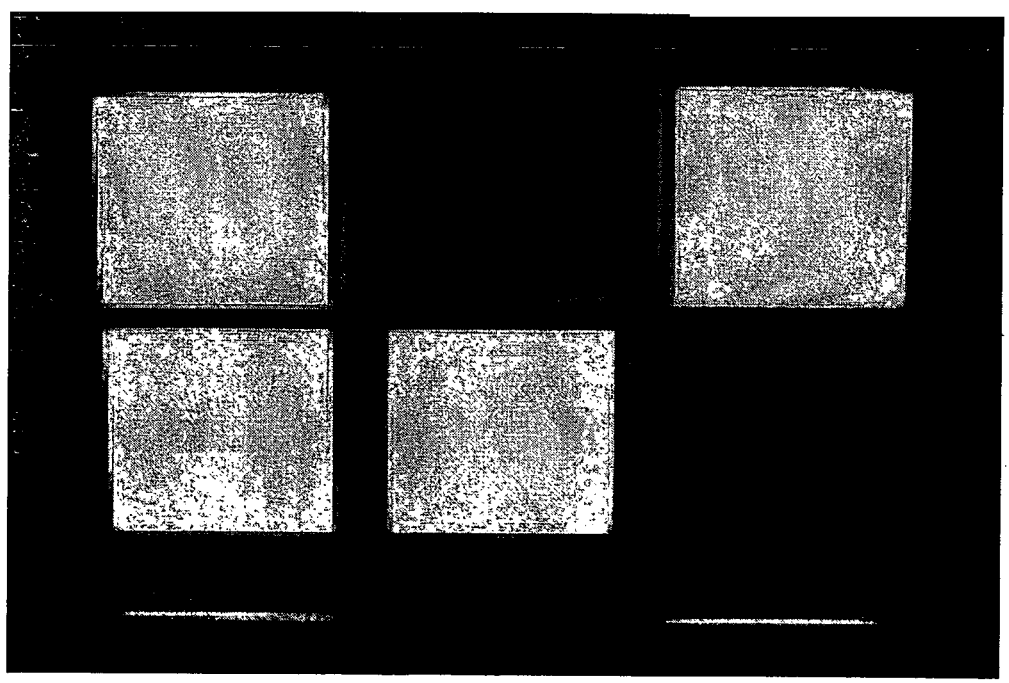

In the multi-cell structured flat light source apparatus according to the present invention, the discharge cells can be partially selected by simultaneously and separately switching (turning on or turning off) the auxiliary electrodes connected to the unit cells. For example, as shown in FIG. 29A, in the case of implementing the flat light source apparatus with 2×3 cells by independently applying a voltage to the auxiliary electrodes in respective cells, if an auxiliary discharge pulse is applied to the auxiliary electrodes $I_{11}$, $I_{13}$, $I_{21}$ and $I_{22}$ in order to cause priming discharges, and the main discharge pulse is applied to the main electrodes, the discharge result shown in FIG. 29D can be obtained. FIG. 29C illustrates the selective priming discharge status obtained by applying the driving waveform shown in FIG. 29B.

Referring to FIG. 29B, one TV frame time is divided into a selective discharge period 291 and an entire discharge sustain period 292, and priming discharges D1 are caused between the main electrode and the auxiliary electrode in the selective priming discharge period 291 by applying at least one driving pulse for a priming discharge in which the voltage Vi of the pulse is greater than that of the priming discharge breakdown voltage by turning on and turning off the switching devices separately connected to all of the cells (the auxiliary electrodes $I_{11}$, $I_{13}$, $I_{21}$ and $I_{22}$ are applied with a priming discharge waveform in the drawings). After the selective priming discharges are caused, the entire surface discharge D2 (period 292) is caused by applying main discharge pulses (the voltage $V_{xy}$ of this pulse is greater than that of the entire surface discharge breakdown voltage) between the main electrodes. It can be understood by people skilled in the art that the discharge pulse having a variety of waveforms, such as the bipolar-type waveform shown in FIG. 20, may be applied between the main electrodes X and Y Such driving method can be applied to the flat light source apparatus having any size of n×m (here, n≧2, m≧2) matrix structured as well as the flat light source apparatus having a size of 2×3.

Figure 30A:
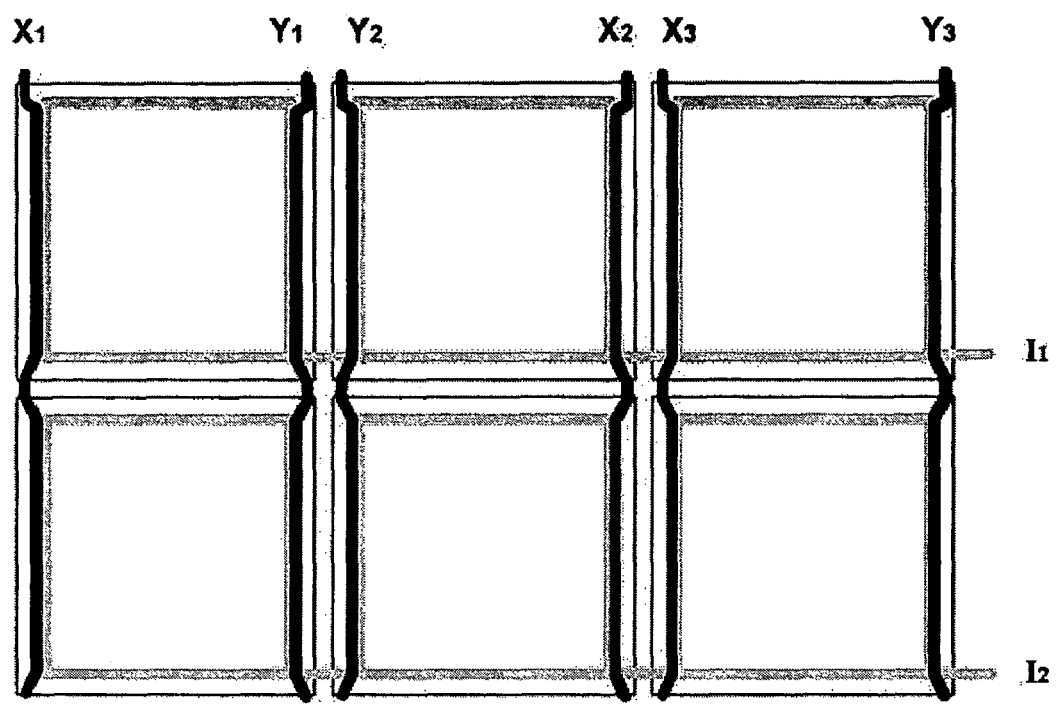

The flat light source apparatus according to the present invention can be selectively driven by sequentially applying the priming discharge application signal between the auxiliary and the main electrodes after connecting the auxiliary electrodes in row or in columns. For example, as shown in FIG. 30A, the flat light source apparatus is constructed by connecting the auxiliary electrodes in rows I1 and I2. In this apparatus, in case of selectively discharging only the cells (1, 1) and (2, 3), a priming discharge pulse is applied between the electrodes $I_1$ and $Y_1$ and applied between the electrodes $I_2$ and $Y_3$ for selective discharge. FIG. 30B illustrates an exemplary driving waveform for obtaining the selective line scanning result in the light source apparatus having a size of n×m matrix. Referring to FIG. 30B, the selective priming discharge period 304 is divided into selection periods (301, 302, 303) for selecting respective lines, priming discharges D1 are caused by applying signals only to the selected main electrodes ($Y_1$, $Y_2$, ...) in the cells to be turned on during the column selection period. During period 301, the auxiliary electrode $I_1$ in the first row is supplied with a signal together with a signal to $Y_1$ causing a priming discharge in (1,1) cell. In the next period 302, the auxiliary electrode $I_2$ is supplied with a signal together with a signal to $Y_3$ causing a priming discharge in (2,3) cell. During the entire surface discharge period 305, main discharges will occur in only the selected cells (1,1) and (2,3) with the aid of priming discharges. The people skilled in the art can understand that the above-described driving method may be applied to the flat light source apparatus having any size of n×m (here, n≧2, m≧2) matrix as well as the apparatus having a 2×3 matrix.

Figure 31:
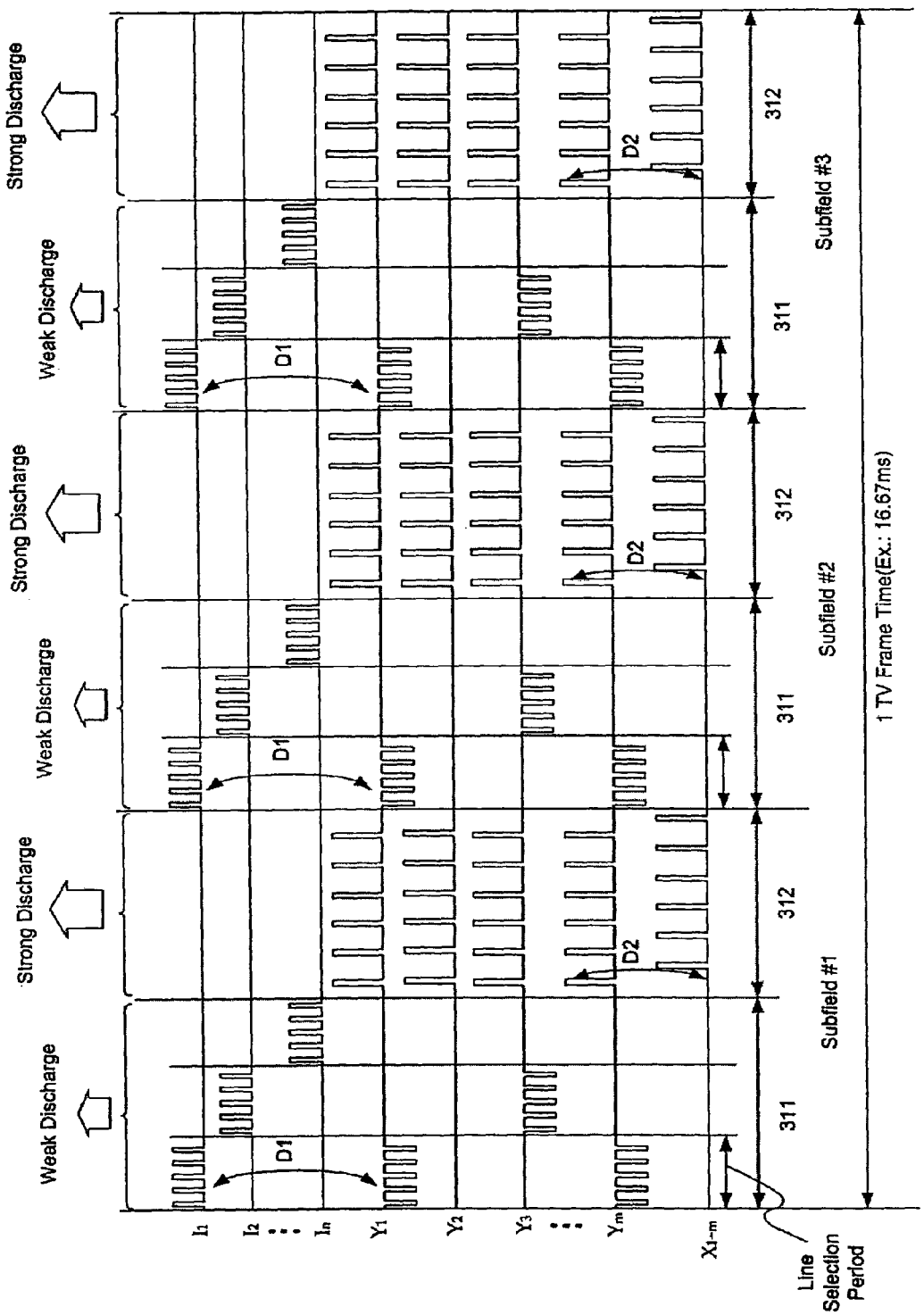
FIG. 31 is a view illustrating a method of driving a flat light source apparatus to which the concept of subfields is applied in order to express brightness with a plurality of levels.

FIG. 31 is a view illustrating driving waveforms used for driving a flat light source apparatus adopting subfield concept for representing a plurality of levels of brightness. Since the flat light source apparatus according to the present invention uses Xe mixture gas discharge which exhibits very short response time of several hundreds nanoseconds, one TV frame period can be period divided into a plurality of subfields, each comprising a selective priming discharge period 311 and an entire surface discharge period 312 for light emission. Here, if the entire surface discharge period for each subfield is set to be different in a ratio of $2^0, 2^1, 2^2, \ldots, 2^n$, the brightness of each cell of the flat light source structure or the entire light source apparatus can be represented by $2^{n+1}$ levels by the combination of the subfields. If this scheme is deployed, the ability to express low gray scale level image with low brightness can be improved, and power consumption can be reduced further.

Figure 32:
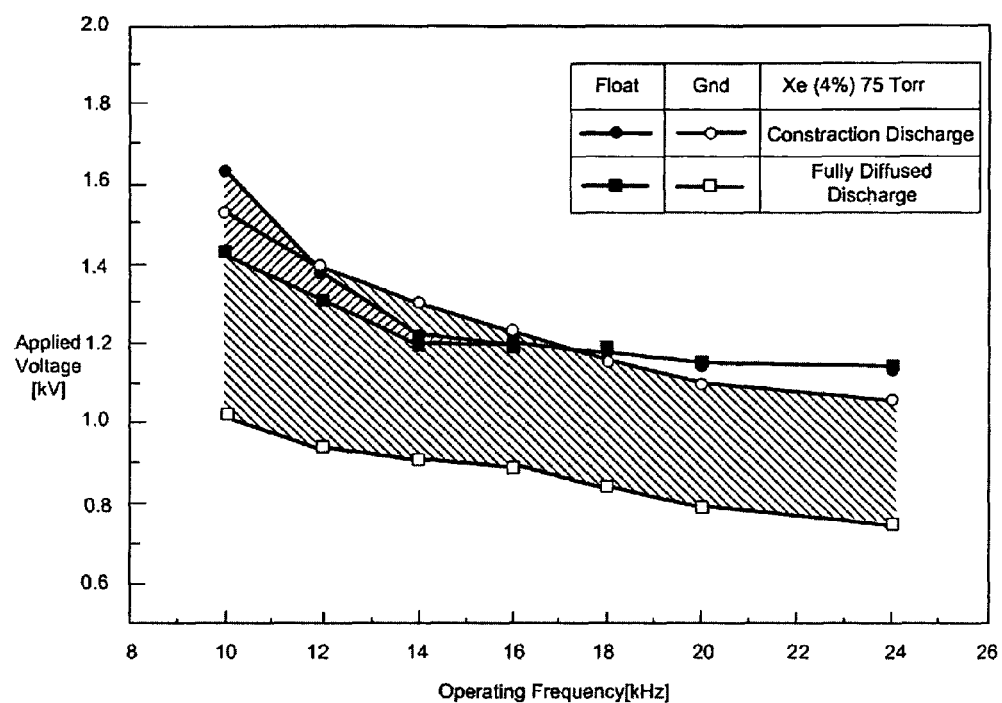
FIG. 32 is a view of the test result of the entire surface discharge voltage and a discharge contraction voltage according to frequencies, wherein the discharge is caused by a floating method and a grounding method at 75 Torr using discharge gas of Xe 4%.

The selective driving method of the multi-cell flat light source apparatus according to the present invention can use the driving waveforms shown in FIG. 6 and FIGS. 17 to 21 in a combined manner. However, it is observed through a test that the voltage margin in the case of using the floating method shown in FIG. 18 is different from that in the case of using the grounding method shown in FIG. 19, according to concentration of Xe. FIG. 32 shows the test result of comparison of the floating method and the grounding method, in which the entire surface discharge voltages and the discharge contraction voltages are measured for respective methods according to varied frequencies under the condition of Xe 4% and 75 Torr. Unlike the conventional flat light source apparatus having no auxiliary electrodes, in which there is no or a small voltage margin for causing the entire surface discharge at low frequencies, the flat light source apparatus according to the present invention has an operational voltage margin of more than 400V over the entire frequency range in the state in which the auxiliary electrode is applied with a ground voltage. However, according to the driving method in which the auxiliary electrode is in the floating state, while the voltage is increased for starting a discharge, the discharge is transferred to the entire surface discharge at relatively low frequencies in the range of 10 to 13 kHz. That is, it is possible to adjust brightness by varying the frequency. However, it is observed that the discharge is directly transferred to a discharge contraction mode without the entire surface discharge mode after a discharge is initiated at relatively high frequencies of 15 kHz or greater. Further, in the test for observing the discharge mode change according to application voltages in the state in which the concentration of Xe in a discharge gas is low, the range of voltages capable of causing an entire surface discharge is very narrow or zero. In this test, if the application voltage is beyond a predetermined voltage, the priming discharge is transferred to the discharge contraction mode, and current abruptly increases. During the discharge contraction mode, even if the application voltage decreases, the entire surface discharge is not caused but the discharge contraction mode is transferred to local discharges and the discharge is then started to be extinguished.

Figure 33:
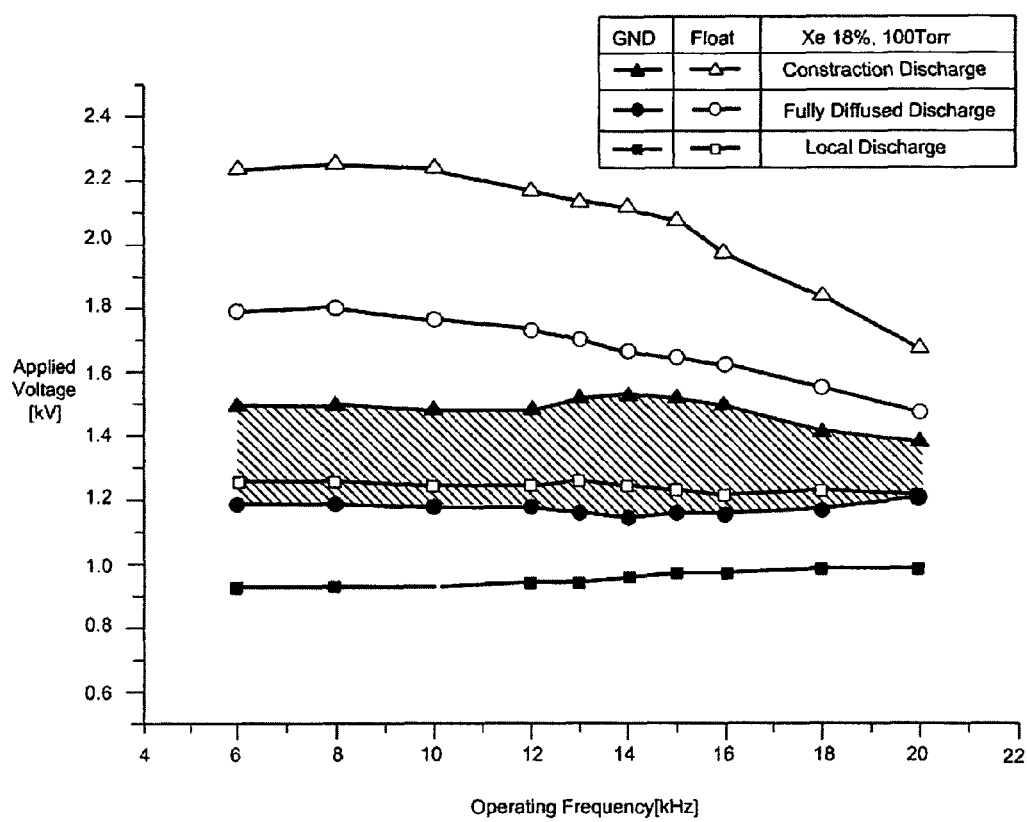
FIG. 33 is a view of the test result of a local discharge voltage, the fully diffused discharge voltage, and the discharge contraction voltage according to frequencies, wherein the discharge is caused by a floating method and a grounding method at 100 Torr using discharge gas of Xe 18%.

On the other hand, the same test is performed for the condition of Xe 18% 100 Torr. The priming discharge voltage, the entire surface discharge voltage and the discharge contraction voltage are observed by varying frequencies, and the test result is shown in FIG. 33. As shown in FIG. 33, the range of voltages capable of causing the priming discharge is relatively wide in both of the floating method and the grounding method if the concentration of Xe is high. It could be understood by people skilled in the art from this result that the role of the auxiliary electrodes becomes important as the concentration of Xe becomes higher, and a high application voltage is required if the auxiliary electrodes are not used.

Further, in the case that the concentration of Xe is high, it is possible to separate the range of voltages according to type of voltages applied to the auxiliary electrodes by changing capacitance between the auxiliary electrode and the main electrode. This is described in more detail with reference to FIG. 34 which is a graph showing the priming discharge voltage, the entire surface discharge voltage, and the discharge contraction voltage which are measured while varying the distance between the auxiliary electrode and the main electrode for respective cases in which the auxiliary electrode is applied with a ground voltage or the floating state.

Figure 34:
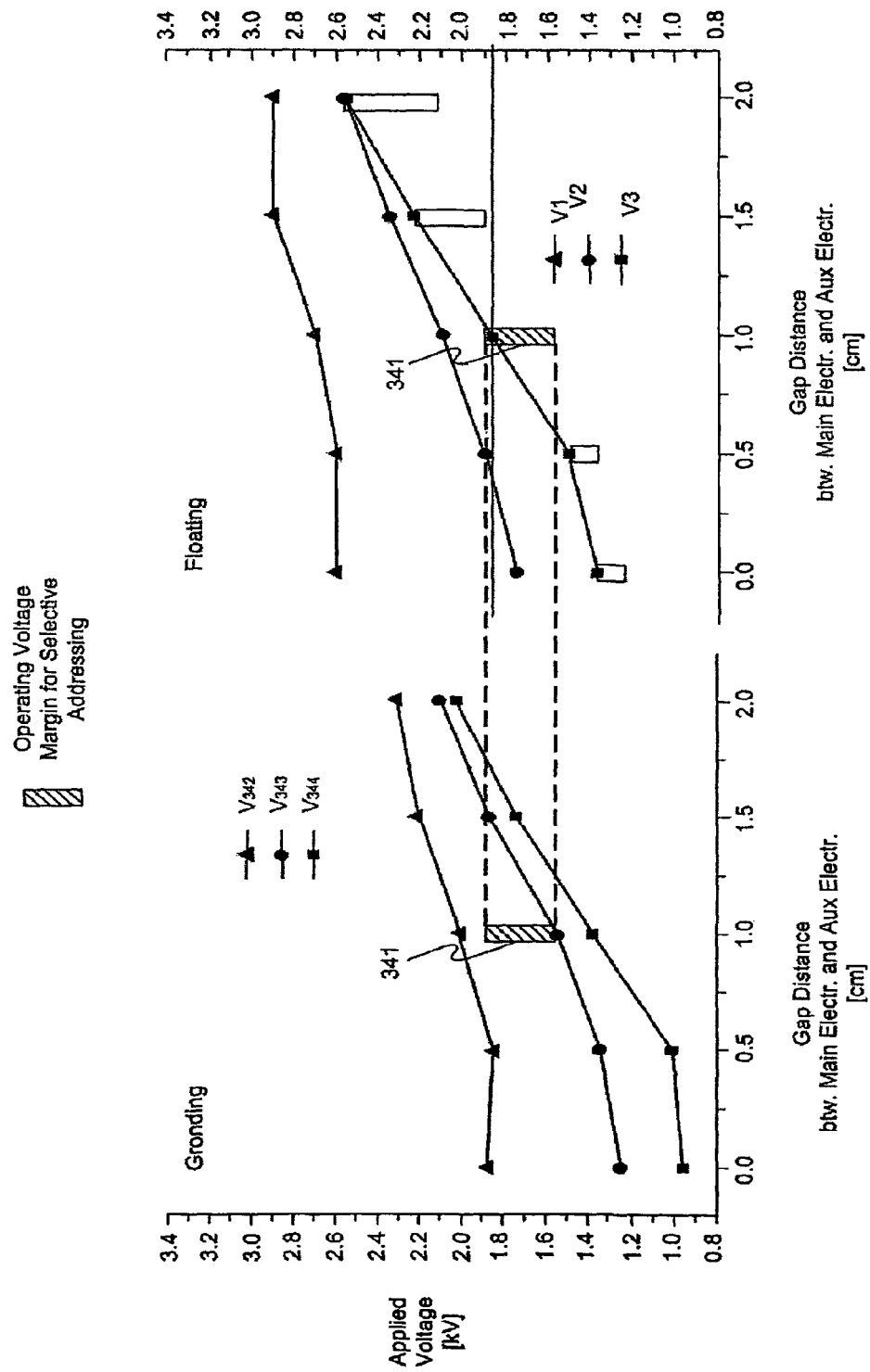
FIG. 34 is a view of the test result of a local discharge voltage, the fully diffused discharge voltage and the discharge contraction voltage according to the distances between the auxiliary electrode and the main electrode, and according to respective cases in which the auxiliary electrode is supplied with a ground voltage in one case, and the auxiliary electrode is floated in the other case.

As shown in FIG. 34, as the distance between the auxiliary electrode and the main electrode becomes larger, the voltages are slightly increased for both cases of the grounding and the floating. However, the voltage margin between the lowest voltage for causing the entire surface discharge in the grounding case and the highest voltage which can not cause the priming discharge (the highest discharge off voltage) in the floating case is also increased. As the result of comparison of the voltage margins, it is known that there is an area (slanted area 341 in FIG. 34) capable of selectively turning on and off the discharge cells according to the potential condition of the auxiliary electrode. This area is the bistable area for selective driving of the flat light source apparatus according to the present invention. In the range of these voltages, selective on/off of the unit cells can be stably performed if the auxiliary electrode is floated or applied with a ground voltage.

Figure 35:
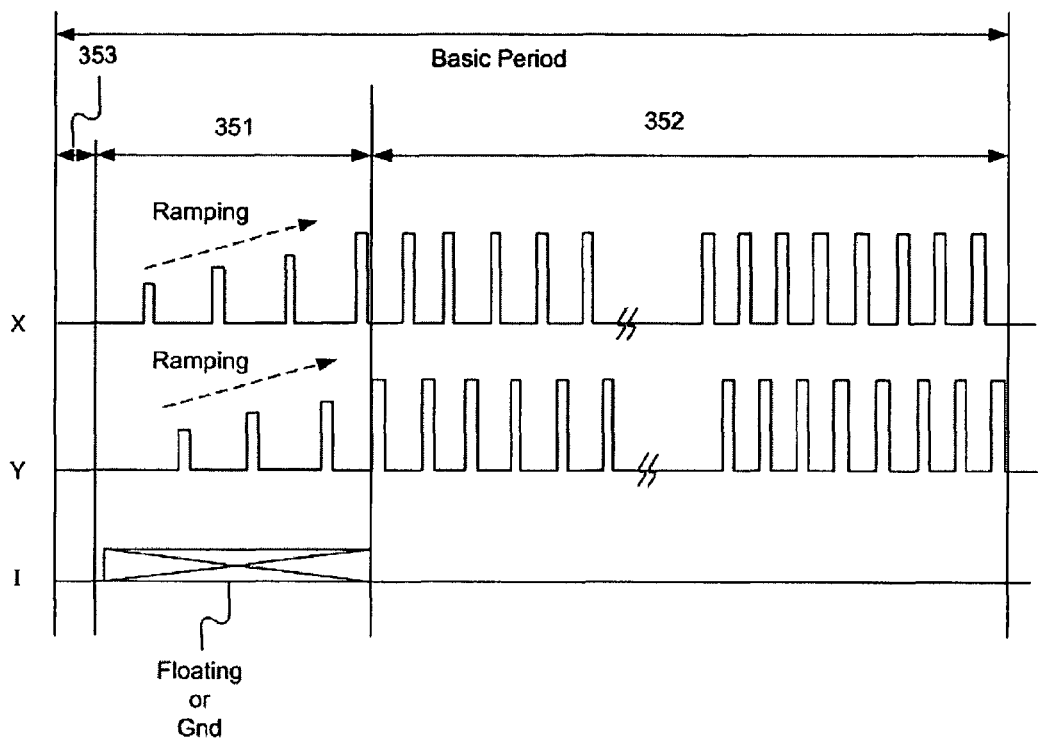
FIG. 35 is an exemplary driving waveform for selectively performing on and off operation.

FIG. 35 illustrates another driving waveform for performing selective on/off of the flat light source apparatus according to the present invention using the above-described characteristic.

Referring to FIG. 35, during the selective priming discharge period 351, in the discharge cells in which the auxiliary electrodes are grounded, as the ramping voltage applied to main electrodes increases, priming discharges are caused, and is then transferred to entire surface discharges, but in the discharge cells in which the auxiliary electrodes are floated, priming discharges are not caused, and the discharge cells stay in off states. In FIG. 35, the voltage waveform applied to main electrode during the selective priming discharge period 351 is a ramping waveform in which the voltage increases. When using the ramping waveform, the ramping time is preferably very short. Alternatively, the main electrodes can be supplied with a constant voltage without ramping. The length of the entire discharge period 352 corresponds to the level of brightness, and the number of pulses is determined taking into account the amount of light emission during the discharge starting and the frequency variation period.

Figure 36:
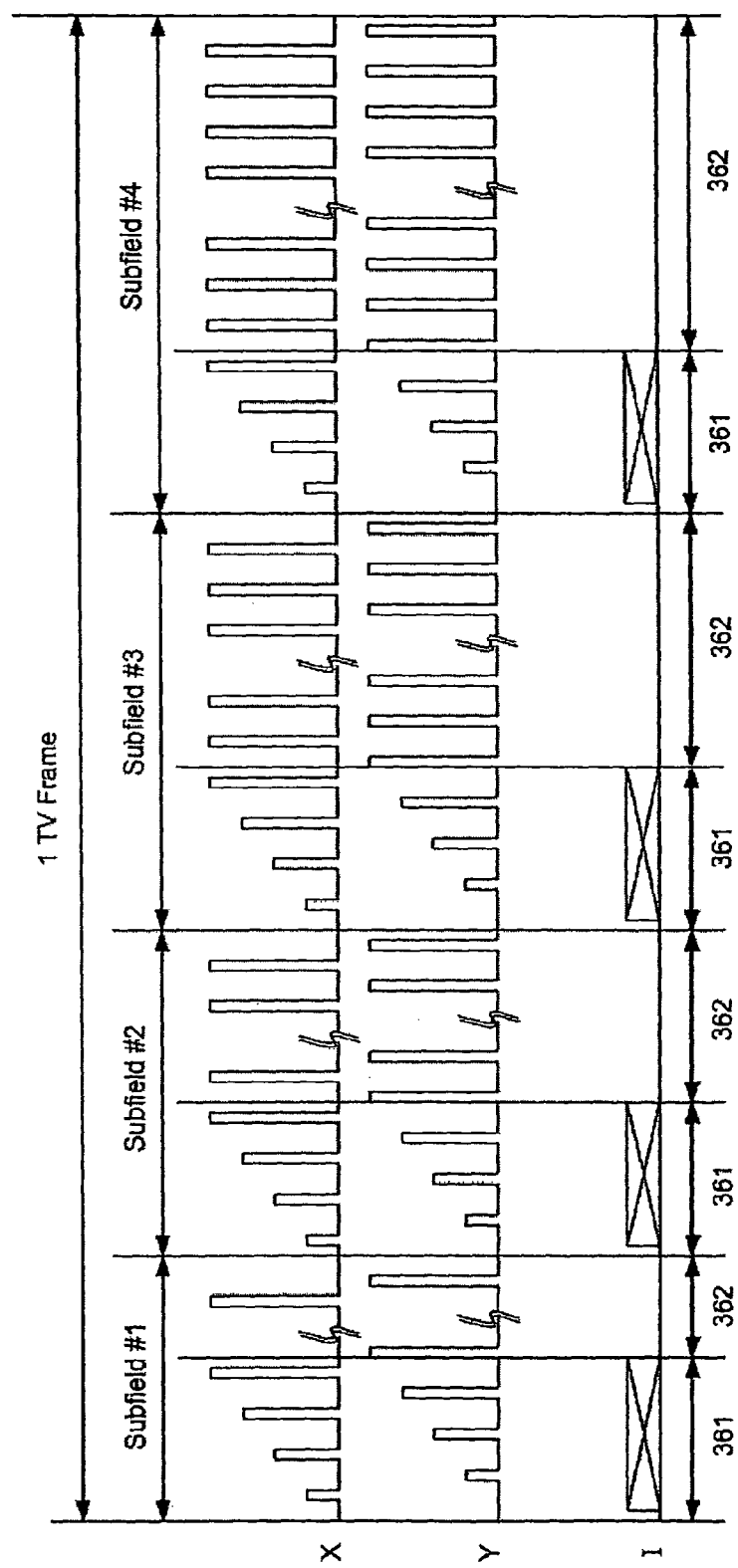
FIG. 36 is a view illustrating a method of driving the flat light source apparatus according to another embodiment of the present invention.

FIG. 36 illustrates driving waveforms used in a selective driving method according to another embodiment of the present invention. The driving method shown in FIG. 36 has 4 bits of weight for one TV frame, selects on and off cells by floating or grounding the auxiliary electrodes during each of the selective priming discharge period 361 in order to perform selective dimming, and the priming discharges are transformed to the entire discharge in the selected cells. Here, the voltage waveform has a ramping time of several hundreds microseconds. Alternatively, the electrodes are applied with a sustain discharge voltage without ramping. In this case, an off time for the cells selected in the previous subfield must be provided, so that an addressing operation in the subsequent subfield is not affected (refer to reference numeral 353 in FIG. 35). Further, as the total gray scale levels increases, more than 4 bits of subfields can be provided. Each weight is set based on pulse width, number of pulses, and frequency variation in order to meet the target brightness level.

In the test of driving the flat light source apparatus according to the present invention using the driving waveforms described above, the dimming ratio (the ratio of the highest brightness to the lowest brightness) is 14.3% (=300/2100) when the concentration of Xe is 4%, and is 6.7% (=360/5400) when the concentration of Xe is 18%. However, the dimming ratio is the one used in the case of the conventional cold cathode fluorescent lamp (CCFL) which can not represent the off state. However, in the flat light source apparatus according to the present invention, the lowest brightness can be the value of 0 since it is possible to freely represent the on and off states due to the short light emission time. Accordingly, the dimming ratio of the flat light source apparatus according to the present invention can be 0 regardless of the concentration of Xe.

In the case of applying the above-described driving method to the flat light source apparatus according to the present invention, in a panel having a discharge gas condition requiring a high discharge voltage, since the voltage for the entire surface discharge increases after the selective on/off function using a priming discharge is performed, the common margin at high voltages in the multi-cell panel decreases. For this reason, it is difficult to realize the high brightness and the selective dimming simultaneously. In order to solve this problem, a dual auxiliary electrode as shown in FIG. 37A can be preferably used by modifying the structure of the auxiliary electrodes.

Figure 37A:
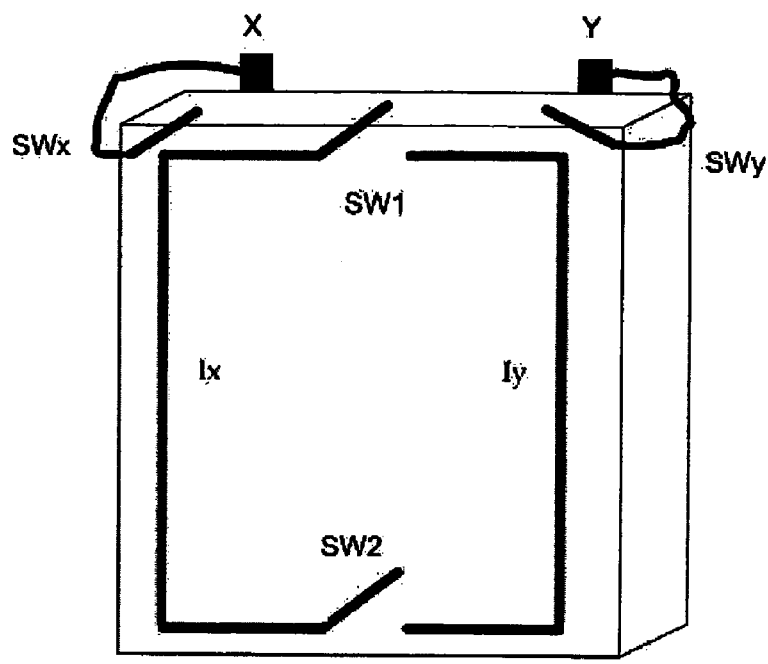
FIGS. 37A to 37C are views illustrating a flat light source structure using a dual auxiliary electrode according to one embodiment of the present invention, and illustrating exemplary driving waveforms to drive such apparatus.
Figure 37B:
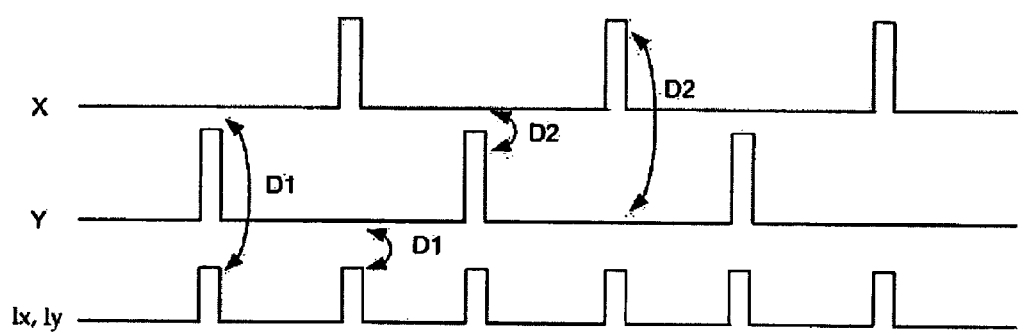
Figure 37C:
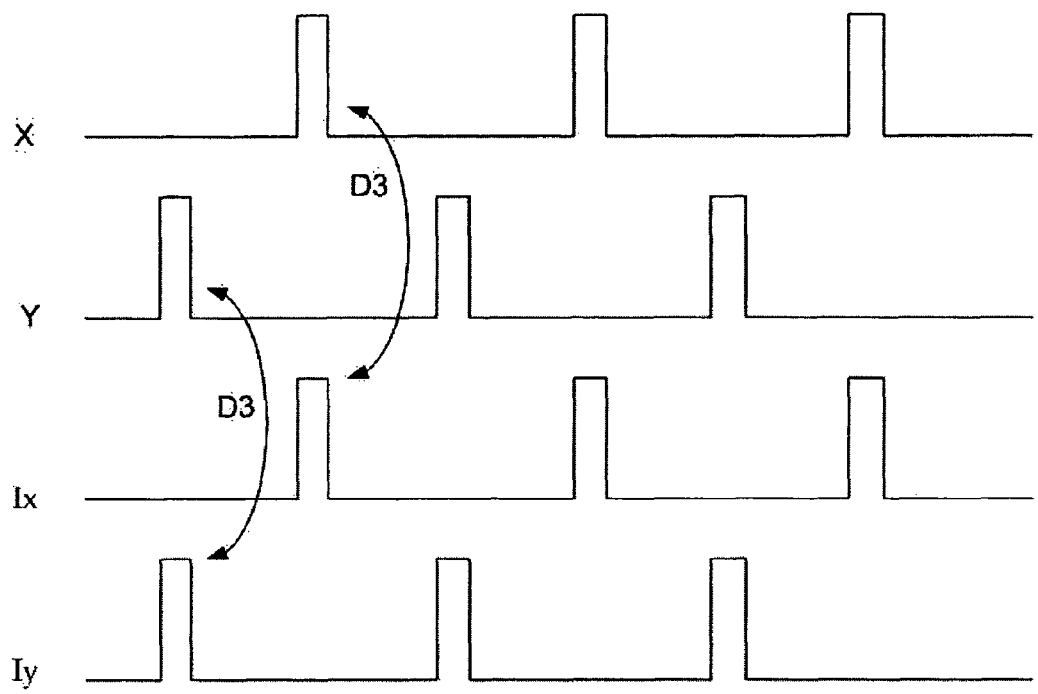

As shown in FIG. 37A, the dual auxiliary electrode comprises the first auxiliary electrode $I_x$, the second auxiliary electrode $I_y$, and two switches $SW_x$ and $SW_y$ for connecting the auxiliary electrodes and the main electrodes. An exemplary driving waveform for turning on the discharge cells and an exemplary driving waveform for turning off the discharge cells are shown in FIG. 37B and FIG. 37C, respectively.

The discharge cells are turned on in the following manner. The two auxiliary electrode switches SW1 and SW2 are closed to connect the first auxiliary electrode $I_x$ and the second auxiliary electrode $I_y$ to each other, and a floating voltage waveform shown in FIG. 37B is then applied. In this instance, the voltage applied to the main electrode Y induces a voltage for causing a priming discharge D1 between the first auxiliary electrode $I_x$ and the main electrode X during the first period, and the voltage applied to the main electrode X causes a priming discharge between the second auxiliary electrode $I_y$ and the main electrode Y during the second period, and these priming discharges are transformed into the entire surface discharge, so that discharge cells are turned on.

The discharge cells are turned off in the following manner. The two auxiliary electrode switches SW1 and SW2 are opened, and the two switches $SW_x$ and $SW_y$ are closed, so that the first auxiliary electrode $I_x$ and the second auxiliary electrode $I_y$ are supplied with the same voltage applied to the main electrodes X and Y respectively. In this instance, since the main electrode X and the first auxiliary electrode $I_x$ have the same potential, and the main electrode X and the second auxiliary electrode $I_y$ also have the same potential, even if the discharge pulses between the main electrodes X and Y are applied, the priming and consequently entire surface discharges cannot be caused due to disturbing discharges D3 between the main electrodes and the auxiliary electrodes.

Figure 38:
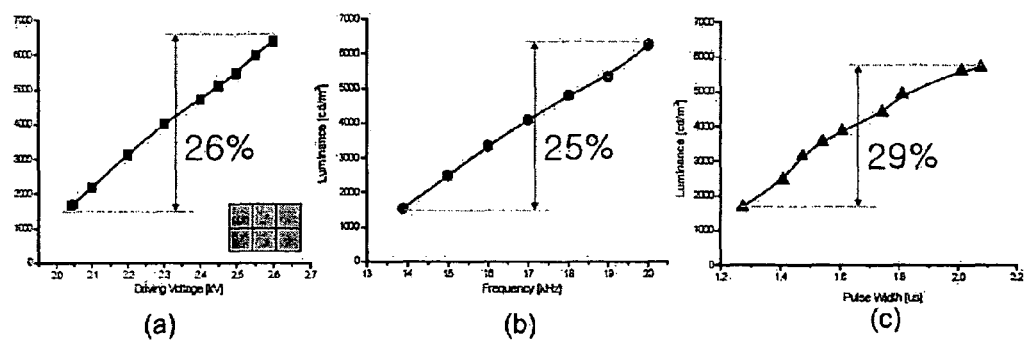
FIGS. 38 to 40 are the test results for obtaining the dimming of brightness according to the application voltage, frequency, and pulse width variation under various conditions when using the dual auxiliary electrode shown in FIG. 37A.
Figure 39:
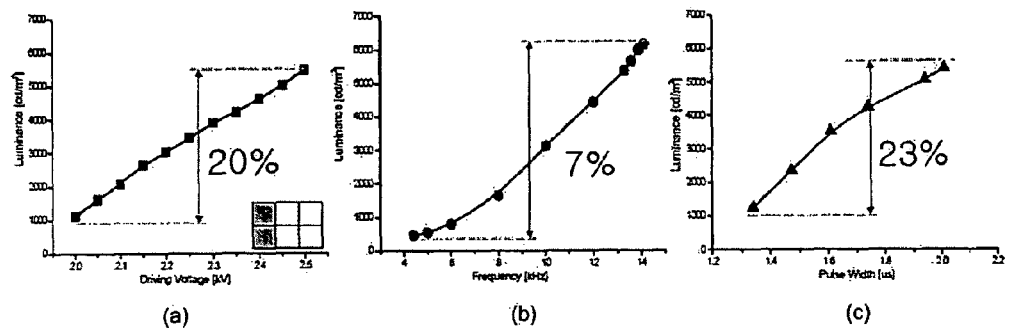

FIGS. 38 and 39 show the test result of dimming ratio according to the change of application voltage, frequency and pulse width in the multi-cell flat light source apparatus having a 2×3 matrix structure shown in FIGS. 29A and 30A when using the dual auxiliary electrodes and performing the selective driving method in the condition of Ne—Xe 18% 100 Torr.

Figure 40:
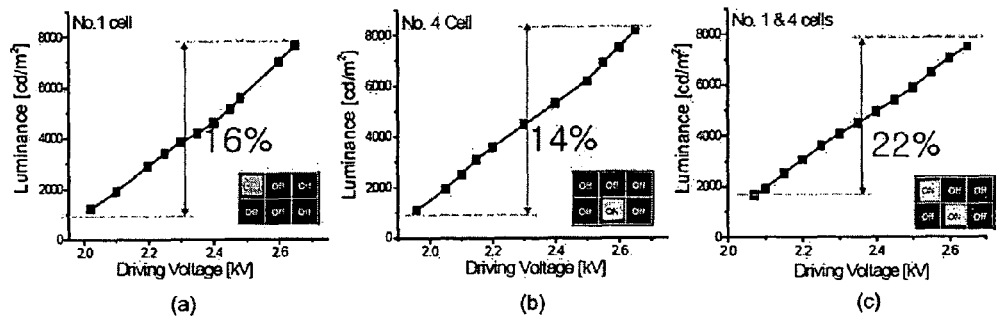

FIGS. 38(*a*), (*b*), (*c*) are graphs showing the change of brightness according to the driving voltage, frequency and pulse width change in the case of turning on all of the 2×3 cells, and FIGS. 39(*a*), (*b*), (*c*) are graphs showing the change of brightness according to driving voltage, frequency and pulse width change in the case of turning on two cells in the left side when selectively driving the flat light source apparatus by line by line. FIGS. 40(*a*), (*b*), (*c*) are graphs showing the change of brightness according to the change of driving voltage when selectively turning on the cell (1, 1), the cell (2, 2) or both of the cells (1, 1) and (2, 2). As a result of the test, in the case of turning on all of the cells, the dimming ratio is 26% when varying the driving voltage, 25% when varying the frequency, and 29% when varying the pulse width. Further, in the case of selective driving line by line, the dimming ratios are 20%, 7% and 23% according to the variation of driving voltage, frequency and pulse width, respectively. Still further, in the case of selective driving cell by cell, the dimming ratio according to the variation of driving voltages is 16% when turning on only the first cell, 14% when turning on only the fourth cell, and 22% when turning on the first cell and the fourth cell. From this test result, it could be understood by people skilled in the art that the common margin among the discharge on cells and off cells can be increased by using the flat light source apparatus having the dual auxiliary electrodes according to the present invention, and the above-described driving method.

Although the flat light source structure, the flat light source apparatus, and the driving method thereof according to a few exemplary embodiments of the present invention have been shown and described, it will be appreciated by those skilled in the art that changes may be made in these embodiments without departing from the principles and spirit of the invention, the scope of which is defined in the appended claims and their equivalents.

According to the present invention, there is provided a flat light source structure having enhanced power efficiency implemented by causing a stable discharge, and a driving method thereof.

There is provided a flat light source structure having a wide driving margin and a wide operational condition.

There is provided a flat light source structure with high brightness and enhanced power efficiency, which is implemented by using a phosphor layer being strong in thermal and mechanical stress and being not easily separated from the lower substrate.

There is provided a large-sized Mercury-free flat light source apparatus having no limitation in its size with low operational voltage.

There is provided a large-sized Mercury-free flat light source apparatus capable of reducing the power consumption for light emission of a backlight, which is usually independent of the image signal and is a problem encountered in LCD TVs, by adjusting the brightness according to the TV image signal.

There is provided a large-sized flat light source apparatus capable of enhancing contrast ratio and quality of image signal by increasing the ratio of the highest brightness to the lowest brightness.

According to the present invention, it is possible to prevent image distortion that can be caused due to the slow response of liquid crystal by controlling the light emission period of the backlight in one TV frame period.

According to the present invention, owing to the deployment of the subfield concept by which a plurality of selective priming discharge periods and a plurality of entire surface discharge periods for light emission can be repeated in a single TV frame period, it is possible to enhance the ability to express the low gray scale levels in LCD TVs.

Accordingly, the present invention can help to advance the realization of Mercury-free flat light source apparatus as real products, and it is expected that the apparatus is widely used as the light sources in display apparatus and lightings.

What is claimed is:

1. A flat light source structure, comprising:
   an upper substrate made of a light transmitting material;
   a lower substrate separated from the upper substrate by a distance;
   a barrier rib for maintaining the distance between the upper substrate and the lower substrate, thereby defining a discharge space filled with a discharge gas at a predetermined pressure between the upper substrate and the lower substrate;
   a phosphor layer coated on at least one of the inner surfaces of the upper substrate and the lower substrate, respectively;
   a pair of main electrodes disposed in the discharge space at predetermined positions on the surface of the upper and/or lower substrate, covered with a dielectric layer in the discharge space, and applied with a predetermined driving voltage to induce electric field which may generate plasma in the discharge space where the vacuum ultra violet rays from plasma excite the phosphor so as for the phosphor to emit visible light; and
   an auxiliary electrode formed at a predetermined position on the lower or upper substrate and having a parallel component and a perpendicular component which are all positioned within the discharge space when viewing the discharge space from the upper substrate,
   wherein the parallel component and the perpendicular component are parallel with and perpendicular to a component of one of the pair of main electrodes parallel with the barrier rib, respectively.

2. The flat light source structure according to claim 1, wherein the auxiliary electrode is formed on the inner surface or the outer surface of the upper or the lower substrate.

3. The flat light source structure according to claim 2, wherein the auxiliary electrode formed on the inner or outer surface of the upper substrate is made of a light transmitting material.

4. The flat light source structure according to claim 1, wherein the auxiliary electrode is patterned to substantially surround the discharge space when viewing the auxiliary electrode from the upper substrate.

5. The flat light source structure according to claim 1, wherein the upper and lower substrates have a rectangular, modified-rectangular or circular shape as a whole.

6. The flat light source structure according to claim 4, wherein the auxiliary electrode looks like a rectangular, modified-rectangular or circular shape as a whole.

7. The flat light source structure according to claim 1, wherein the phosphor layer is formed non-uniformly depending on its locations on the inner surface of the upper substrate.

8. The flat light source structure according to claim 6, wherein the phosphor is formed as a pattern with a plurality of island structures separated from each other.

9. The flat light source structure according to claim 1, wherein the lower substrate has a plurality of micro barrier ribs with a height smaller than that of the barrier rib on the inner surface thereof and the micro barrier ribs are covered with the phosphor layer.

10. The flat light source structure according to claim 1, wherein the discharge gas contains Xe.

11. The flat light source structure according to claim 10, wherein the discharge gas further contains any one gas or more selected from the group consisting of He, Ne, Ar and Kr.

12. The flat light source structure according to claim 1, wherein the lower substrate has micro barrier ribs with a height less than that of the barrier rib on the inner surface thereof, and the phosphor is coated to cover the micro barrier ribs.

13. A flat light source apparatus having a plurality of the flat light source structures according to claim 1 arranged repetitively.

14. A flat light source apparatus comprising a plurality of the flat light source structures according to claim 1, which serves as a unit cell and is arranged in a matrix form, wherein first electrodes and second electrodes in the unit cells are connected in row or in column, thereby forming shared electrodes, and the first electrode in each unit cell is disposed nearer to the first electrode in the adjacent cell than the second electrode.

15. The flat light source apparatus according to claim 14, wherein auxiliary electrodes in the unit cells are connected to each other in column or in row in the perpendicular direction to the connected main electrodes.

16. The flat light source structure according to claim 1, wherein the auxiliary electrode is divided into a first auxiliary electrode and a second auxiliary electrode being parallel to the first electrode and the second electrode, respectively, of the pair of main electrodes.

17. The flat light source structure according to claim 16, wherein a discharge of the flat light source structure is allowed to occur by connecting the first auxiliary electrode and the second auxiliary electrode to each other and prevented by connecting the first and second auxiliary electrode to their corresponding main electrodes respectively.

* * * * *